US012578537B2

(12) United States Patent
Iida

(10) Patent No.: US 12,578,537 B2
(45) Date of Patent: Mar. 17, 2026

(54) FERRULE CLEANER CAP OF OPTICAL CONNECTOR PLUG

(71) Applicant: SANWA TECHNOLOGIES CO., LTD., Tokyo (JP)

(72) Inventor: Masafumi Iida, Tokyo (JP)

(73) Assignee: SANWA TECHNOLOGIES CO., LTD., Tokyo (JP)

( * ) Notice: Subject to any disclaimer, the term of this patent is extended or adjusted under 35 U.S.C. 154(b) by 271 days.

(21) Appl. No.: 18/364,929

(22) Filed: Aug. 3, 2023

(65) Prior Publication Data

US 2024/0272372 A1    Aug. 15, 2024

(30) Foreign Application Priority Data

Feb. 13, 2023    (JP) ................................. 2023-019910

(51) Int. Cl.
| | |
|---|---|
| *G02B 6/38* | (2006.01) |
| *B08B 1/14* | (2024.01) |
| *B08B 1/32* | (2024.01) |

(52) U.S. Cl.
CPC ............ *G02B 6/3866* (2013.01); *B08B 1/143* (2024.01); *B08B 1/32* (2024.01); *G02B 6/3849* (2013.01)

(58) Field of Classification Search
CPC .... G02B 6/3849; G02B 6/3866; B08B 1/143; B08B 1/32
See application file for complete search history.

(56) References Cited

U.S. PATENT DOCUMENTS

| | | | |
|---|---|---|---|
| 10,481,342 B1 | 11/2019 | Yang et al. | |
| 11,422,314 B2 * | 8/2022 | Beranek | ............... G02B 6/3849 |

| | | | | |
|---|---|---|---|---|
| 2011/0229088 A1 * | 9/2011 | Isenhour | ............. | G02B 6/4292 |
| | | | | 385/78 |
| 2016/0259131 A1 | 9/2016 | Erdman et al. | | |
| 2019/0346630 A1 | 11/2019 | Yang et al. | | |
| 2020/0218015 A1 | 7/2020 | Ho et al. | | |

FOREIGN PATENT DOCUMENTS

| | | |
|---|---|---|
| JP | H10221565 A | 8/1998 |
| JP | 2005189730 A | 7/2005 |
| JP | 2019200411 A | 11/2019 |
| JP | 6839725 B2 | 3/2021 |

OTHER PUBLICATIONS

Partial ESR cited in corresponding European Patent Appln. 23190782.5 issued on Jan. 19, 2024.

* cited by examiner

*Primary Examiner* — Daniel Petkovsek
(74) *Attorney, Agent, or Firm* — BACON & THOMAS.PLLC

(57)    ABSTRACT

A ferrule cleaner cap of an optical connector plug includes a plug retainer having a through port for a ferrule F in a leading end so as to bring a cleaning cloth into contact with a front face portion of the ferrule of an optical plug, and an opening for inserting and escaping the optical connector plug in a rear end, and a cap main body having the plug retainer built-in and forming in an inner side a mounting portion for a cleaning cloth fitted to the through port and bringing the cleaning cloth into contact with a front face portion of the ferrule protruding forward. The ferrule cleaner of the optical connector plug can securely, easily and inexpensively remove and clean the refuse and the other contaminated objects attached to the ferrule leading end surface at the same time of detaching the cap.

5 Claims, 26 Drawing Sheets

*FIG. 9A*
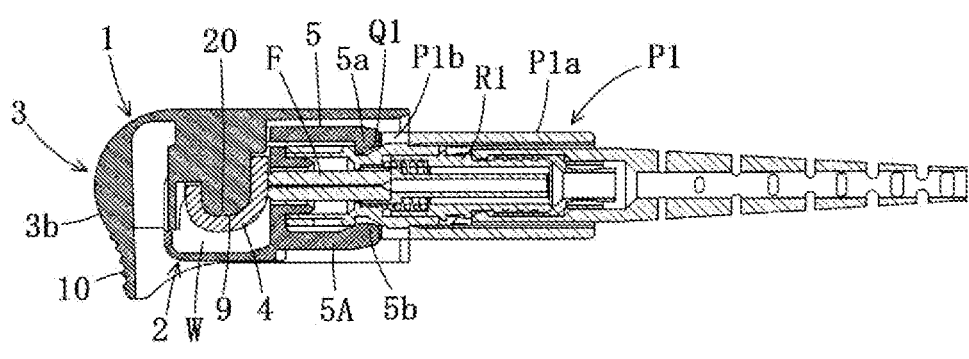
*FIG. 9B*
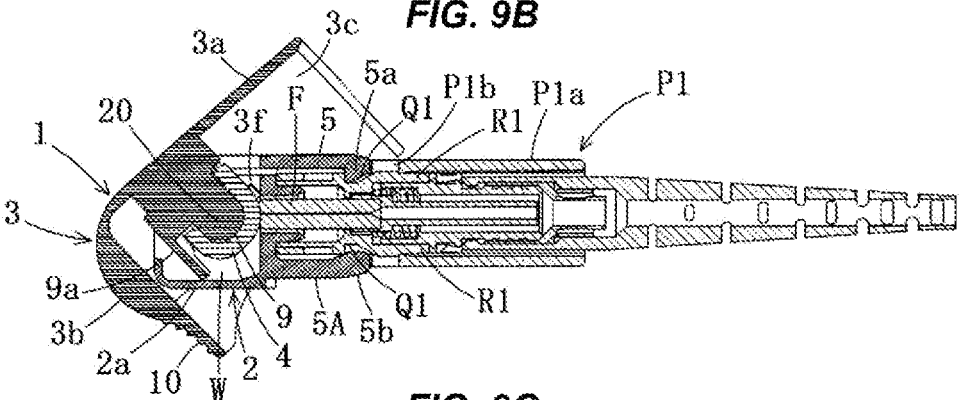
*FIG. 9C*
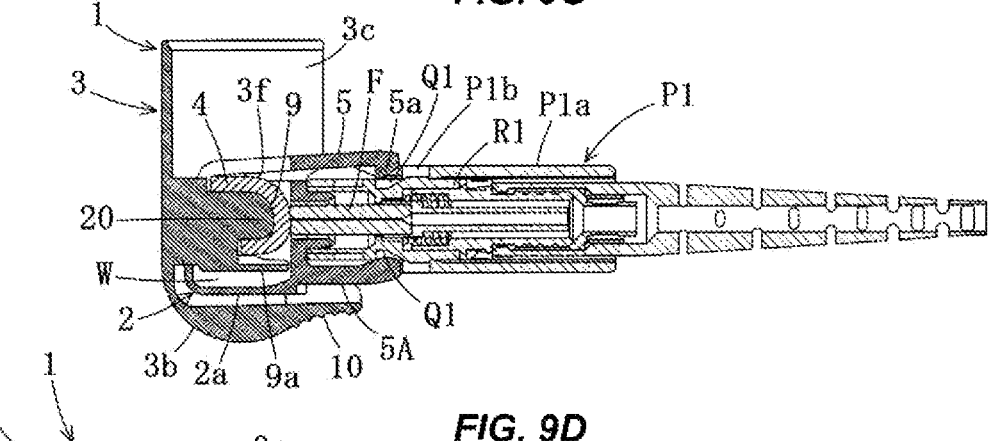
*FIG. 9D*
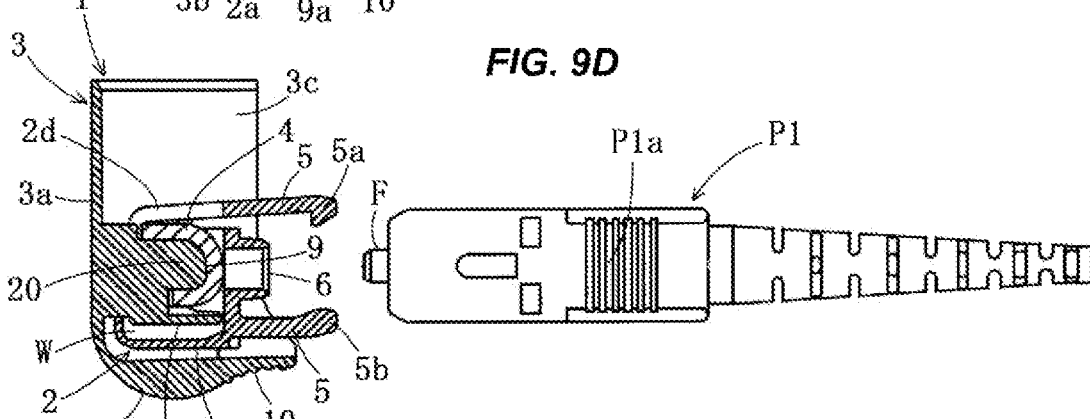

*FIG. 17A*
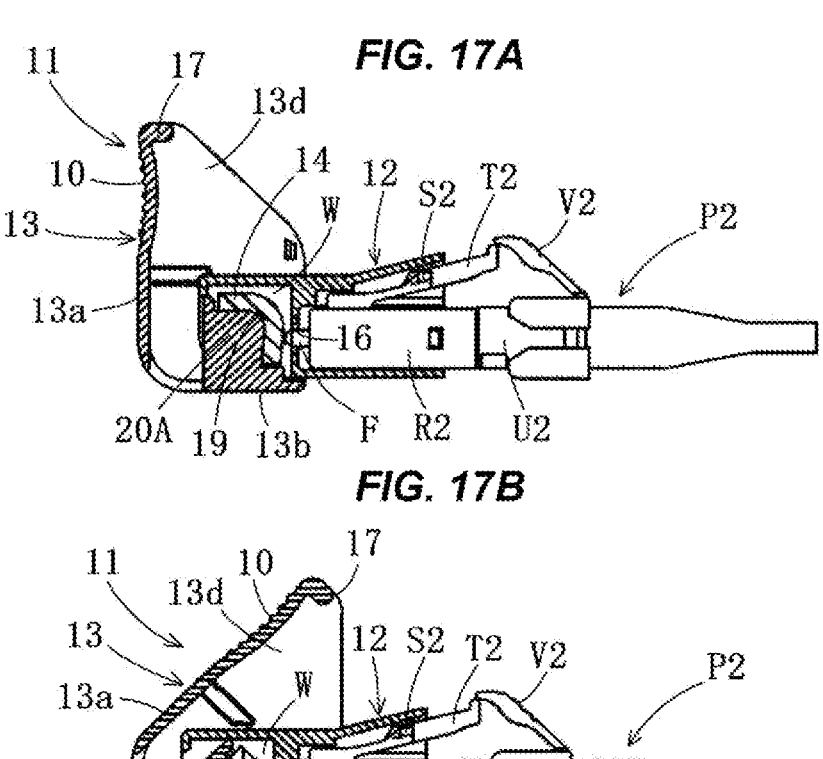
*FIG. 17B*
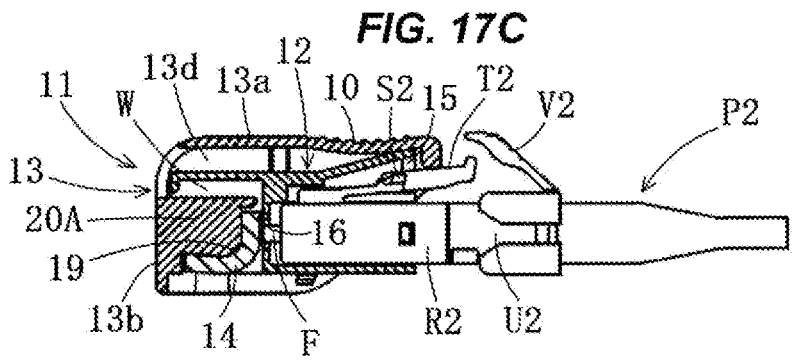
*FIG. 17C*
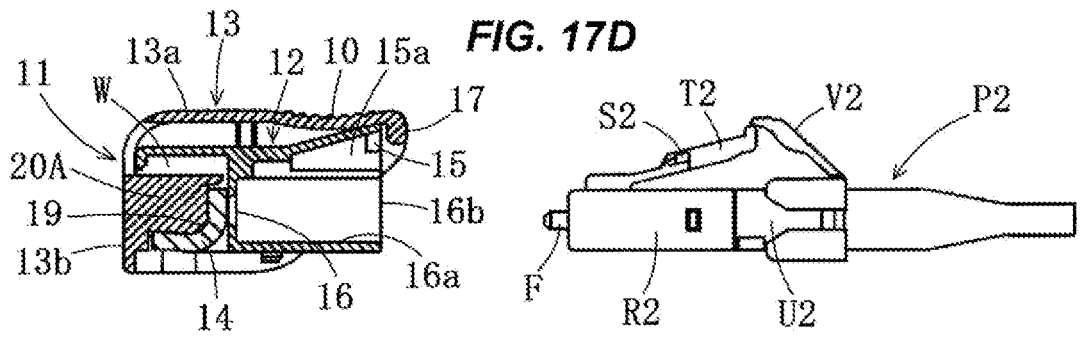
*FIG. 17D*

FERRULE CLEANER CAP OF OPTICAL CONNECTOR PLUG

TECHNICAL FIELD

The present invention relates to a ferrule cleaner cap of an optical connector plug.

BACKGROUND ART

Conventionally, when an optical connector plug is connected to an adapter in a work site, it has been necessary to remove refuse and the other contaminated objects attached to a ferrule leading end surface which is provided in a protruding manner in a plug leading end for every works. However, when the optical connector plug is connected to the adapter in the work site, it is necessary to separately carry a cleaner in order to remove the contaminated objects attached to the ferrule leading end surface, thereby occurring a problem that convenience lacks.

In order to solve the conventional problem as mentioned above, there has been proposed "dust prevention device having a cleaning function for an optical fiber connector" in Patent Literature 1.

More specifically, the dust prevention device is provided with a dust removal lid including a frame which is constructed in such a manner as to cover a front end of an optical fiber connector, and a coating which is connected to the frame and can be rotated in such a manner as to move toward the frame and away from the frame, and a cleaning component which is arranged on the frame so as to clean the optical fiber connector, and the coating is closed so as to close the cleaning component and is turned up and opened so as to allow the cleaning component to be exposed.

Further, when the dust prevention device is used for cleaning the ferrule of the optical fiber connector, the dust removal lid is detached from the optical fiber connector. Thereafter, the dust removal lid is rotated at 180 degrees and the coating is turned up and opened so as to allow the cleaning component to be exposed. Thereafter, the cleaning component is brought into contact with the ferrule in order to sweep away the refuse and the dust on the ferrule.

CITATION LIST

Patent Literature

Patent Literature 1: Japanese Unexamined Patent Publication No. 2019-200411

SUMMARY OF INVENTION

Technical Problem

However, in the conventional patent literature 1 mentioned above, steps of taking out and cleaning a dust prevention device (cap) are separated in the means for removing the contaminated objects attached to the ferrule leading end surface in which the dust prevention device having a cleaning function is provided in a leading end of an optical connector plug.

More specifically, the invention disclosed in the above patent literature 1 is not adapted to clean the ferrule leading end by opening and closing the coating in the dust prevention device, and is therefore high in cost due to complexity in the entire construction and step. Further, this invention also has a defect that a working property is deteriorated.

Moreover, there is a defect that the ferrule is used in a state in which the contaminated objects are attached since forgetting to clean may often occur.

Accordingly, the present invention is made by taking into consideration the conventionally existing defects as mentioned above, and an object of the present invention is to provide a ferrule cleaner cap of an optical connector plug which can securely, easily and inexpensively remove and clean the refuse and the other contaminated objects attached to the ferrule leading end surface at the same time of detaching the cap, and can securely prevent forgetting to clean for the ferrule because of a cleaning step which is always performed when detaching the cap.

Solution to Problem

In order to solve the problem mentioned above, in the present invention, a ferrule cleaner cap includes a plug retainer which has a through port of a ferrule in a front end side thereof for bringing a cleaning cloth into contact with a ferrule front face portion of an optical connector plug, and has an opening for inserting and escaping the optical connector plug in a rear end side thereof, and a cap main body which has the plug retainer built-in and forms in an inner side a mounting portion for the cleaning cloth bringing the cleaning cloth into contact with the ferrule front face portion inserted and attached to the through port and protruding forward, the cap main body is axially supported so as to be rotatable upward or downward with respect to the plug retainer, and the cleaning cloth mounted to the mounting portion in an inner portion of the cap main body is formed so as to bring the ferrule front face portion protruding forward from the through port of the plug retainer leading end into sliding contact upward or downward, thereby cleaning the ferrule front face portion.

The plug retainer is adapted to retain an optical connector plug including a pair of upper and lower retainers which lock to locking concave portions disposed in upper and lower portions of a knob so as to freely engage and disengage and have a spring property, the through port for fitting the ferrule of the optical connector plug is provided at the center of a front section wall of a base portion between both the locking devices, and a space portion housing the cleaning cloth mounting portion in the inner portion of the cap main body is adjacently arranged in a front side in an opposite side to both the locking devices in the through port.

The mounting portion of the cap main body forms a leading end of an approximately quadrangular block into a round form so as to curve the cleaning cloth made of a material having a flexibility into a circular arc shape when being mounted.

The plug retainer is adapted to retain an optical connector plug including a release lever which extends diagonally rearward on an upper surface of an outer periphery of a coupling sleeve and is provided in a protruding manner with an engagement projection in both right and left sides, and a latch lever which extends diagonally forward on an upper surface of an outer periphery of a main body frame and comes into contact with the protruding end of the release lever from the above, the plug retainer is provided in a rear end with a plug housing portion having an opening inserting and removing the optical connector plug, a lever housing portion for pressing a release lever and releasing the pressing is provided above the housing portion, the release lever having in both right and left sides locked portions locking in a freely engaging and disengaging manner engagement projections which are provided in a protruding manner in both right and left sides of the release lever, a through port for fitting the ferrule of the optical connector plug is provided in the center of the front section wall of the plug housing portion, and a space portion housing the cleaning cloth mounting portion of the cap main body is adjacently arranged in an opposite front side of the plug housing portion of the through port.

The mounting portion of the cap main body forms a leading end of an approximately quadrangular block into a round form so as to curve the cleaning cloth made of a material having a flexibility into a circular arc shape when being mounted.

The cap main body has an upper wall, a front wall and right and left side walls and is open in a rear side and a lower side, is structured such that the mounting portion of the cleaning cloth is provided in a protruding manner in an inner side of the upper wall, and is formed so as to be rotatable upward and downward with respect to the plug retainer via a spindle which is provided in the right and left side walls.

A ferrule cleaner cap includes a plug retainer which has a through port of a ferrule in a front end side thereof for bringing a cleaning cloth into contact with a ferrule front face portion of an optical connector plug, and has an opening for inserting and escaping the optical connector plug in a rear end side thereof, and a cap main body which has the plug retainer built-in and forms in an inner side a mounting portion for the cleaning cloth bringing the cleaning cloth into contact with the ferrule front face portion inserted and attached to the through port and protruding forward, the cap main body is supported so as to be slidable upward or downward with respect to the plug retainer, and the cleaning cloth mounted to the mounting portion in an inner portion of the cap main body is formed so as to bring the ferrule front face portion protruding forward from the through port of the plug retainer into sliding contact downward from upward, thereby cleaning the ferrule front face portion.

The plug retainer is adapted to retain an optical connector plug including a release lever which extends diagonally rearward on an upper surface of an outer periphery of a coupling sleeve and is provided in a protruding manner with an engagement projection in both right and left sides, and a latch lever which extends diagonally forward on an upper surface of an outer periphery of a main body frame and comes into contact with the protruding end of the release lever from the above, the plug retainer is provided in a rear end with a plug housing portion having an opening inserting and removing the optical connector plug, a lever housing portion for pressing a release lever and releasing the pressing is provided above the housing portion, the release lever having in both right and left sides locked portions locking in a freely engaging and disengaging manner engagement projections which are provided in a protruding manner in both right and left sides of the release lever, a through port for fitting the ferrule of the optical connector plug is provided in the center of the front section wall of the plug housing portion, and a cap holder capable of fitting the cap main body upward or downward is adjacently arranged in an opposite front side of the plug housing portion of the through port.

The cap holder is formed by a fixing frame formed into a rectangular shape in a plan view by fixing an open end side of an inverted-C shaped frame to a front end of the plug housing portion.

The fixing frame is open in an upper end thereof, and has a front face plate in a front side of a front section wall of the plug housing portion via a space fitting and fixing the cap main body.

The cap main body has an upper wall, a front wall and right and left side walls and is open in a rear side and a lower side, arranges a rear plate in an inner side of the front wall at a predetermined space, and forms an insertion groove fixing and retaining the plug retainer to the plug main body by inserting the front face plate of the plug retainer between the front wall and the rear plate from a lower end opening side.

A lower side at the rear of the rear plate of the cap main body is notched, and the notch portion is set to a cleaning cloth mounting portion to which a flat plate shaped cleaning cloth is mountable.

A projection for pushing down the release lever of the plug retainer is disposed in an inner rear side of the upper wall of the cap main body.

Effect of Invention

On the basis of the structure mentioned above according to the present invention, it is possible to clean and remove the refuse and the other contaminated objects attached to the ferrule leading end surface by the cleaning cloth mounted within the cap in a state in which the cap dust preventing and protecting the various optical connector ferrule is fitted, and the cap fitted to the ferrule leading end can be taken out only after cleaning and removing the contaminated objects. Therefore, there can be achieved an effect that the ferrule in a state in which the contaminated objects are attached to the leading end surface is not erroneously used when the optical connector plug is connected to the adapter.

More specifically, according to the present invention, the ferrule cleaner cap includes the plug retainer which has the through port of the ferrule in the front end side thereof for bringing the cleaning cloth into contact with the ferrule front face portion of the optical connector plug, and has the opening for inserting and escaping the optical connector plug in the rear end side thereof, and the cap main body which has the plug retainer built-in and forms in the inner side the mounting portion for the cleaning cloth bringing the cleaning cloth into contact with the ferrule front face portion inserted and attached to the through port and protruding forward, the cap main body is axially supported so as to be rotatable upward or downward with respect to the plug retainer, and the cleaning cloth mounted to the mounting portion in the inner portion of the cap main body is formed so as to bring the ferrule front face portion protruding forward from the through port of the plug retainer leading end into sliding contact upward or downward, thereby cleaning the ferrule front face portion.

Therefore, it is possible to securely, easily and inexpensively remove and clean the refuse and the other contaminated objects attached to the ferrule leading end surface while being brought into sliding contact by the cleaning cloth on the basis of the upward or downward rotation for the plug retainer of the cap main body, and it is further possible to securely prevent forgetting to clean for the ferrule according to the prior art.

The plug retainer is adapted to retain the optical connector plug including a pair of upper and lower retainers which lock to the locking concave portions disposed in the upper and lower portions of the knob so as to freely engage and disengage and have a spring property, the through port for fitting the ferrule of the optical connector plug is provided at the center of the front section wall of the base portion between both the locking devices, and the space portion housing the cleaning cloth mounting portion in the inner portion of the cap main body is adjacently arranged in the front side in the opposite side to both the locking devices in the through port.

Therefore, it is possible to securely, easily and inexpensively remove and clean the refuse and the other contaminated objects attached to the ferrule leading end surface while being brought into sliding contact by the cleaning cloth on the basis of the rotation for the plug retainer of the cap main body, and it is simultaneously possible to easily release the locking of the locking concave portion of the knob, thereby smoothly detaching the cap main body from the optical connector plug.

The mounting portion of the cap main body forms the leading end of the approximately quadrangular block into a round form so as to curve the cleaning cloth made of the material having a flexibility into the circular arc shape when being mounted.

Therefore, the cleaning cloth always keep sliding contact with the ferrule leading end surface during the rotation of the cap main body, and it is possible to securely, easily and inexpensively remove and clean the refuse and the other contaminated objects attached to the ferrule leading end surface.

The plug retainer is adapted to retain the optical connector plug including the release lever which extends diagonally rearward on the upper surface of the outer periphery of the coupling sleeve and is provided in a protruding manner with the engagement projection in both the right and left sides, and the latch lever which extends diagonally forward on the upper surface of the outer periphery of the main body frame and comes into contact with the protruding end of the release lever from the above, the plug retainer is provided in the rear end with the plug housing portion having the opening inserting and removing the optical connector plug, the lever housing portion for pressing the release lever and releasing the pressing is provided above the plug housing portion, the release lever having in both the right and left sides locked portions locking in a freely engaging and disengaging manner the engagement projections which are provided in a protruding manner in both the right and left sides of the release lever, the through port for fitting the ferrule of the optical connector plug is provided in the center of the front section wall of the plug housing portion, and the space portion housing the cleaning cloth mounting portion of the cap main body is adjacently arranged in the opposite front side of the plug housing portion of the through port.

Therefore, it is possible to securely, easily and inexpensively remove and clean the refuse and the other contaminated objects attached to the ferrule leading end surface while being brought into sliding contact by the cleaning cloth on the basis of the rotation for the plug retainer of the cap main body, and it is simultaneously possible to easily release the locking of the locked portion, thereby smoothly detaching the cap main body from the optical connector plug.

The mounting portion of the cap main body forms the leading end of the approximately quadrangular block into a round form so as to curve the cleaning cloth made of the material having a flexibility into a circular arc shape when being mounted.

Therefore, the cleaning cloth always keep sliding contact with the ferrule leading end surface during the rotation of the cap main body, and it is possible to securely, easily and inexpensively remove and clean the refuse and the other contaminated objects attached to the ferrule leading end surface.

The cap main body has the upper wall, the front wall and the right and left side walls and is open in the rear side and the lower side, is structured such that the mounting portion of the cleaning cloth is provided in a protruding manner in the inner side of the upper wall, and is formed so as to be rotatable upward and downward with respect to the plug retainer via the spindle which is provided in the right and left side walls.

Therefore, it is possible to smoothly and securely perform the rotating operation of the cap main body for the plug retainer.

The ferrule cleaner cap includes the plug retainer which has the through port of the ferrule in the front end side thereof for bringing the cleaning cloth into contact with the ferrule front face portion of the optical connector plug, and has the opening for inserting and escaping the optical connector plug in the rear end side thereof, and the cap main body which has the plug retainer built-in and forms in the inner side the mounting portion for the cleaning cloth bringing the cleaning cloth into contact with the ferrule front face portion inserted and attached to the through port and protruding forward, the cap main body is supported so as to be slidable upward or downward with respect to the plug retainer, and the cleaning cloth mounted to the mounting portion in the inner portion of the cap main body is formed so as to bring the ferrule front face portion protruding forward from the through port of the plug retainer into sliding contact downward from upward, thereby cleaning the ferrule front face portion.

Therefore, it is possible to securely, easily and inexpensively remove and clean the refuse and the other contaminated objects attached to the ferrule leading end surface while being brought into sliding contact by the cleaning cloth on the basis of the upward or downward sliding for the plug retainer of the cap main body, and it is further possible to securely prevent forgetting to clean for the ferrule according to the prior art.

The plug retainer is adapted to retain the optical connector plug including the release lever which extends diagonally rearward on the upper surface of the outer periphery of the coupling sleeve and is provided in a protruding manner with the engagement projection in both the right and left sides, and the latch lever which extends diagonally forward on the upper surface of the outer periphery of the main body frame and comes into contact with the protruding end of the release lever from the above, the plug retainer is provided in the rear end with the plug housing portion having the opening inserting and removing the optical connector plug, the lever housing portion for pressing the release lever and releasing the pressing is provided above the housing portion, the release lever having in both the right and left sides the locked portions locking in a freely engaging and disengaging manner the engagement projections which are provided in a protruding manner in both the right and left sides of the release lever, the through port for fitting the ferrule of the optical connector plug is provided in the center of the front section wall of the plug housing portion, and the cap holder capable of fitting the cap main body upward or downward is adjacently arranged in the opposite front side of the plug housing portion of the through port.

Therefore, the plug can be securely fixed to the plug retainer on the basis of the housing of the plug retainer of the optical connector plug within the plug housing, the housing of the release lever within the lever housing portion and the locking of the release lever to the locked portion, and the upward or downward sliding motion of the cap main both can be smoothly and securely achieved by the cap holder.

The cap holder is formed by the fixing frame formed into a rectangular shape in a plan view by fixing the open end side of the inverted-C shaped frame to the front end of the plug housing portion.

Therefore, it is possible to securely and smoothly slide the cap main body upward or downward and fix and retain the cap main body at a predetermined position by means of the fixing frame.

The fixing frame is open in the upper end thereof, and has the front face plate in the front side of the front section wall of the plug housing portion via the space fitting and fixing the cap main body.

Therefore, it is possible to securely prevent the cap main body from falling during the sliding motion in a vertical direction by means of the front face plate.

The cap main body has the upper wall, the front wall and the right and left side walls and is open in the rear side and the lower side, arranges the rear plate in the inner side of the front wall at a predetermined space, and forms the insertion groove fixing and retaining the plug retainer to the plug main body by inserting the front face plate of the plug retainer between the front wall and the rear plate from the lower end opening side.

Therefore, the front face plate can be fixed and retained by the insertion groove of the cap main body and it is possible to securely control the upward and downward sliding operation of the cap main body.

The lower side at the rear of the rear plate of the cap main body is notched, and the notch portion is set to the cleaning cloth mounting portion to which the flat plate shaped cleaning cloth is mountable.

Therefore, the cleaning cloth mounted to the notch portion can be always brought into sliding contact with the ferrule front face, and it is possible to securely prevent the cleaning cloth from falling during the cleaning operation.

The projection for pushing down the release lever of the plug retainer is disposed in the inner rear side of the upper wall of the cap main body.

Therefore, it is possible to easily and securely remove the optical connector plug by pushing down the release lever of the plug retainer on the basis of the downward sliding motion of the cap main body.

BRIEF DESCRIPTION OF DRAWINGS

FIGS. 1A to 1F show an entire cap before rotation of a ferrule cleaner cap corresponding to an SC type optical connector plug showing a first embodiment of the present invention, in which FIG. 1A is a right side elevational view, FIG. 1B is a back elevational view, FIG. 1C is a front elevational view, FIG. 1D is a bottom elevational view, FIG. 1E is a plan view, and FIG. 1F is a cross sectional view along a line A-A.

FIGS. 2G to 2I show the same entire cap, in which FIG. 2G is a perspective view, FIG. 2H is a side elevational view after rotation, and FIG. 2I is a cross sectional view after rotation.

FIGS. 3A to 3C show an example of a cap main body according to the first embodiment, in which FIG. 3A is a back elevational view, FIG. 3B is a bottom elevational view, and FIG. 3C is a cross sectional view along a line B-B in FIG. 3A.

FIGS. 4A to 4F show a plug retainer of the SC type optical connector plug attached to an inner portion of the cap main body according to the first embodiment, in which FIG. 4A is a plan view, FIG. 4B is a right side elevational view, FIG. 4C is a bottom elevational view, FIG. 4D is a front elevational view, FIG. 4E is a back elevational view, and FIG. 4F is a side cross sectional view.

FIGS. 5A to 5C show a cleaning cloth used in the ferrule cleaner caps according to the first embodiment and a second embodiment, in which FIG. 5A is a front elevational view, FIG. 5B is a side elevational view, and FIG. 5C is a perspective view.

FIGS. 6A to 6C show a cleaning cloth used in a ferrule cleaner cap according to a third embodiment, in which FIG. 6A is a front elevational view, FIG. 6B is a side elevational view, and FIG. 6C is a perspective view.

FIGS. 7A to 7D show an example of using the ferrule cleaner cap according to the first embodiment, in which FIGS. 7A, 7B and 7C are views showing a rotating motion of a cap main body, and FIG. 7D is a view showing a state in which an SC type optical connector plug is detached after the rotation.

FIGS. 8A to 8C show the ferrule cleaner cap according to the first embodiment, in which FIG. 8A is a cross sectional view along a line D-D in FIG. 7A, FIG. 8B is a cross sectional view along a line E-E in FIG. 7B, and FIG. 8C is a cross sectional view along a line F-F in FIG. 7C.

FIGS. 9A to 9D show an example of using the ferrule cleaner cap according to the first embodiment, in which FIGS. 9A, 9B and 9C are cross sectional views showing a rotating motion of the cap main body, and FIG. 9D is a cross sectional view showing a state in which the SC type optical connector plug is detached after the rotation.

FIGS. 10A to 10C show an example of using a ferrule leading end surface brought into sliding contact by the ferrule cleaner cap according to the first embodiment, in which FIG. 10A is a cross sectional view showing a main section before the rotation of the cap main body, FIG. 10B is a cross sectional view showing the main section in the middle of rotation of the cap main body, and FIG. 10C is a cross sectional view showing the main section after the rotation of the cap main body.

FIGS. 11A to 11E show an entire cap before the rotation of the ferrule cleaner cap corresponding to a dual LC type optical connector plug showing the second embodiment according to the present invention, in which FIG. 11A is a right side elevational view, FIG. 11B is a back elevational view, FIG. 11C is a front elevational view, FIG. 11D is a bottom elevational view, and FIG. 11E is a plan view.

FIGS. 12F and 12G show an example of the same entire cap, in which FIG. 12F is a perspective view, and FIG. 12G is a cross sectional view.

FIGS. 13A to 13C show an example of a cap main body according to a second embodiment, in which FIG. 13A is a top elevational view, FIG. 12B is a back elevational view, FIG. 13C is a cross sectional view.

FIGS. 14A to 14F show a plug retainer of an LC type optical connector plug built in the cap main body according to the second embodiment, in which FIG. 14A is a side elevational view, FIG. 14B is a back elevational view, FIG. 14C is a front elevational view, FIG. 14D is a bottom elevational view, FIG. 14E is a plan view, and FIG. 14F is a cross sectional view along a line H-H in FIG. 14B.

FIGS. 15A to 15D show an example of using the ferrule cleaner cap according to the second embodiment, in which FIGS. 15A, 15B and 15C are views showing a rotating motion of the cap main body, and FIG. 15D is a view showing a state in which the LC type optical connector plug is detached after the rotation.

FIGS. 16A to 16C show an example of using the ferrule cleaner cap according to the second embodiment, in which FIG. 16A is a cross sectional view before the rotation, FIG.

16B is a cross sectional view in the middle of rotation, and FIG. 16C is a cross sectional view after the rotation.

FIGS. 17A to 17D show an example of using the ferrule cleaner cap according to the second embodiment, in which FIGS. 17A, 17B and 17C are cross sectional views showing a rotating motion of the cap main body, and FIG. 17D is a cross sectional view showing a state in which the LC type optical connector plug is detached after the rotation.

FIGS. 18A to 18C show an example of using in a drawing motion of the LC type optical connector plug mounted to a plug retainer by the ferrule cleaner cap according to the second embodiment, in which FIG. 18A is a cross sectional view of a main section before the rotation of the cap main body, FIG. 18B is a cross sectional view of the main section in the middle of rotation of the cap main body, and FIG. 18C is a cross sectional view of the main section after the rotation of the cap main body.

FIGS. 19A to 19C show an example of using the ferrule leading end surface brought into sliding contact by the ferrule cleaner cap according to the second embodiment, in which FIG. 19A is a cross sectional view showing a main section before the rotation of the cap main body, FIG. 19B is a cross sectional view showing the main section in the middle of rotation of the cap main body, and FIG. 19C is a cross sectional view showing the main section after the rotation of the cap main body.

FIGS. 20A to 20E show an entire cap before the downward sliding of the ferrule cleaner cap corresponding to the dual LC type optical connector plug showing a third embodiment according to the present invention, in which FIG. 20A is a right side elevational view, FIG. 20B is a back elevational view, FIG. 20C is a front elevational view, FIG. 20D is a bottom elevational view, and FIG. 20E is a plan view.

FIGS. 21F and 21G show an example of the ferrule cleaner cap according to the third embodiment, in which FIG. 21F is a perspective view, and FIG. 21G is a cross sectional view along a line L-L in FIG. 20B.

FIGS. 22A to 22C show a cap main body according to the third embodiment, in which FIG. 22A is a back elevational view, FIG. 22B is a bottom elevational view, and FIG. 22C is a cross sectional view along a line M-M in FIG. 22A.

FIGS. 23A to 23F show a plug retainer according to the third embodiment, in which FIG. 23A is a side elevational view, FIG. 23B is a back elevational view, FIG. 23C is a front elevational view, FIG. 23D is a bottom elevational view, FIG. 23E is a plan view, and FIG. 23F is a cross sectional view along a line N-N in FIG. 23B.

FIGS. 24A to 24D show an example of using the ferrule cleaner cap according to the third embodiment, in which FIGS. 24A, 24B and 24C are views showing a downward sliding motion of the cap main body, and FIG. 24D is a view showing a state in which a push type LC type optical connector plug is detached after the sliding.

FIGS. 25A to 25D show an example of using the ferrule cleaner cap according to the third embodiment, in which FIGS. 25A, 25B and 25C are cross sectional views showing a downward sliding motion of the cap main body, and FIG. 25D is a cross sectional view showing a state in which the LC type optical connector plug is detached after the sliding.

FIGS. 26A to 26C show an example of using in a drawing motion of the LC type optical connector plug mounted to the plug retainer by the ferrule cleaner cap according to the third embodiment, in which FIG. 26A is a cross sectional view of a main section before the falling of the cap main body, FIG. 26B is a cross sectional view of the main section in the middle of falling of the cap main body, and FIG. 26C is a cross sectional view of the main section after the falling of the cap main body.

FIGS. 27A to 27C show an example of using the ferrule leading end surface brought into sliding contact by the ferrule cleaner cap according to the third embodiment, in which FIG. 27A is a cross sectional view showing a main section before the sliding of the cap main body, FIG. 27B is a cross sectional view showing the main section in the middle of sliding of the cap main body, and FIG. 27C is a cross sectional view showing the main section after the sliding of the cap main body.

DESCRIPTION OF EMBODIMENTS

Figure 1A:
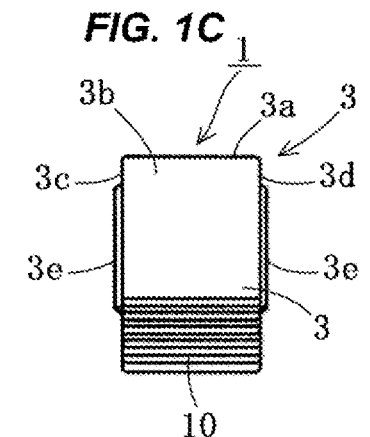
Figure 1B:
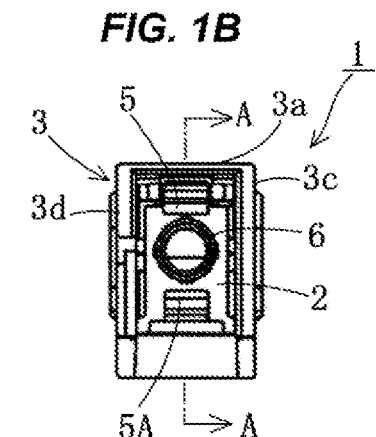
Figure 1C:
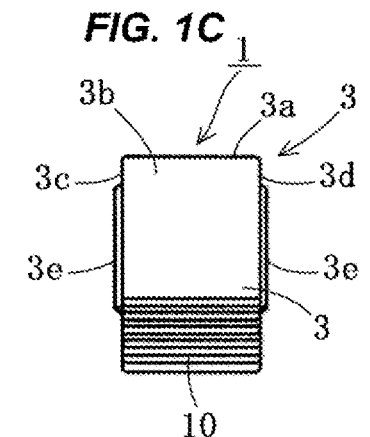
Figure 1D:
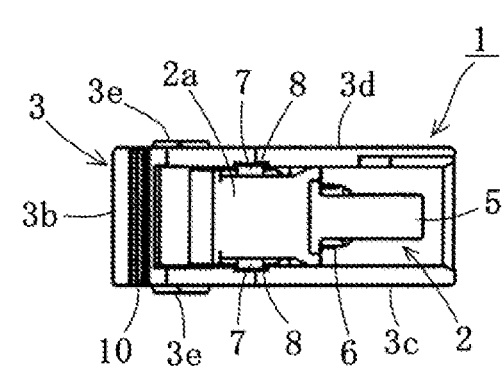
Figure 1E:
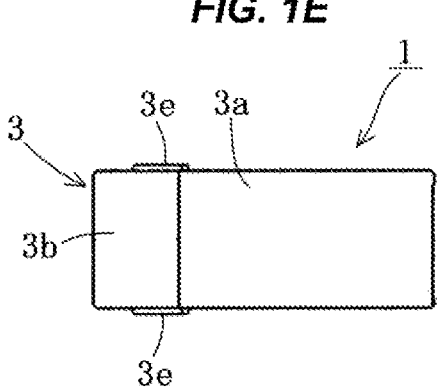
Figure 1F:
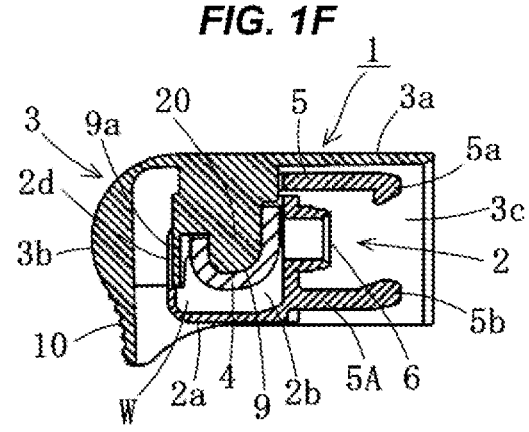

An outline of a first embodiment and a second embodiment in the present invention exists in a ferrule cleaner cap including a plug retainer 2, 12 which has a through port 6, 16 of a ferrule F in a leading end thereof for bringing a cleaning cloth 4, 14 into contact with a front face portion of the ferrule F in an optical connector plug, and has an opening for inserting and escaping the optical connector plug in a rear end thereof, and a cap main body 3, 13 which has the plug retainer built-in and forms in an inner side a mounting portion 9, 19 for the cleaning cloth bringing the cleaning cloth 4, 14 into sliding contact with the front face portion of the ferrule F inserted and attached to the through port 6, 16 and protruding forward, in which the cap main body is axially supported so as to be rotatable upward or downward with respect to the plug retainer 2, 12.

Further, an outline of a third embodiment in the present invention exists in a ferrule cleaner cap in which a cap main body 23 is formed so as to be slidable upward and downward with respect to a plug retainer 22, and the cleaning cloth 14 mounted to a mounting portion 29 in an inner portion of the cap main body 23 is formed so as to slide and bring the front face portion of the ferrule F protruding forward from a through port 26 in a leading end of the plug retainer 22 into sliding contact downward from upward.

First Embodiment

A description will be in detail given below of a first embodiment according to the present invention with reference to FIGS. 1 to 11.

Figure 5A:
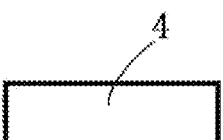
Figure 5B:
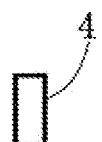
Figure 5C:
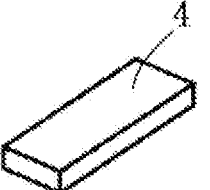

In the present embodiment, as shown in FIGS. 1A to 1F and FIGS. 2G and 2I, a ferrule cleaner cap 1 corresponding to an SC type optical connector plug P1 is formed with a plug retainer 2 for retaining the SC type optical connector plug P1, a cap main body 3 which is rotatable with respect to the plug retainer 2, and a long cleaning cloth 4 which is shown in FIG. 5, is mounted to the cap main body 3 and has a flexibility.

The plug retainer 2 is provided in an upper side thereof with a locking device 5 which has a stop portion 5a in a leading end locking to a locking concave portion Q1 (refer to FIG. 9) on one side surface of a knob R1 of the SC type optical connector plug P1 and has a spring property, as shown in FIGS. 4A to 4F, and is also provided in a lower side thereof with an arm 5A which has a circular arc portion 5b in a leading end so as to simply come into contact with the locking concave portion Q1 in the other side surface of the knob R1 without locking and has a spring property. Further, a cylindrical through port 6 for allowing the ferrule F to fit toward a front side is provided at the center of a front section wall of a base portion between both the locking devices 5, and a space portion W housing a mounting portion 9 for the cleaning cloth 4 constructed by an approximately quadrangular block 20 having a leading end formed into a round shape is adjacently arranged in a front side in an opposite side of the through port 6 to both the locking devices 5 so as to curve into a circular arc shape in an inner portion of the cap main body 3. In FIG. 9, reference symbol P1*a* denotes a plug frame which constructs an outer shell of the SC type optical connector plug P1 and is formed into a horizontally quadrangular tube, and has in a front side thereof an opening portion P1*b* which communicates with the locking concave portion Q1 of the knob R1.

More specifically, an outer side at the rear of the plug retainer 2 is constructed by a bottom surface 2*a* and right and left side surfaces 2*b* and 2*c*, and an open portion 2*d* is formed in an upper side and a rear side of the right and left side surfaces 2*b* and 2*c*, thereby forming an inner portion of the retainer in the space portion W. Further, a spindle 7 is formed outward at both side symmetrical positions of the right and left side surfaces 2*b* and 2*c* of the plug retainer 2.

Figure 3A:
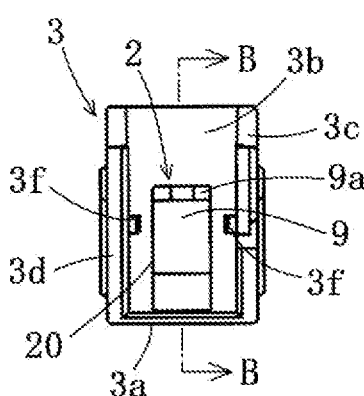
Figure 3B:
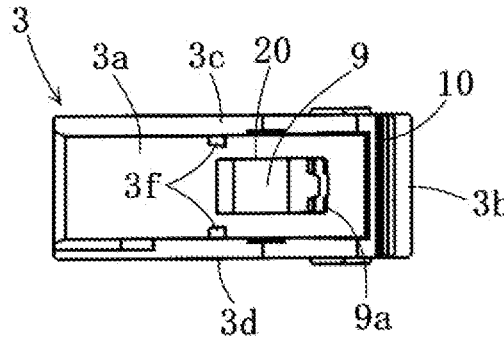
Figure 3C:
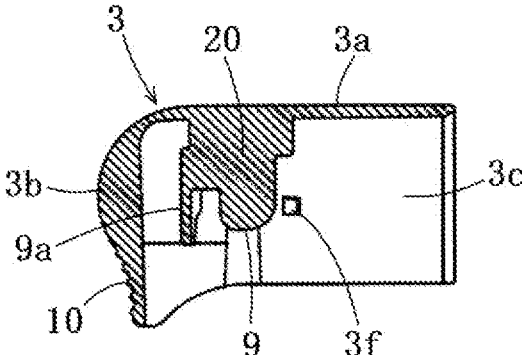
Figure 4A:
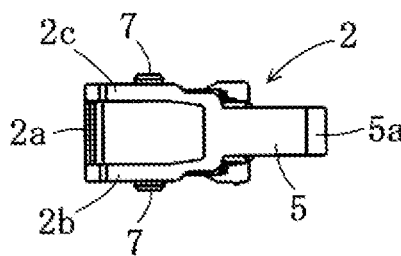
Figure 4D:
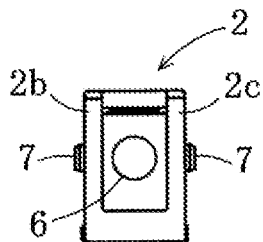
Figure 4B:
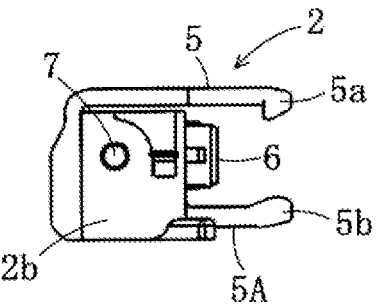
Figure 4E:
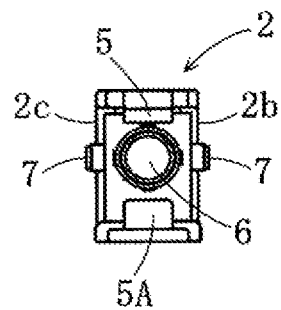
Figure 4C:
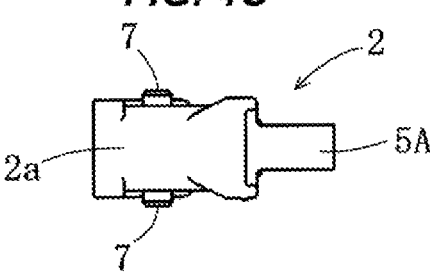
Figure 4F:
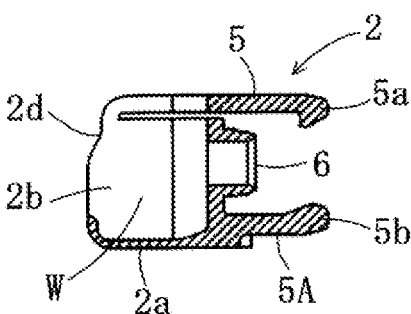

The cap main body 3 is open in a rear side and a lower side thereof with an upper wall 3*a*, a front wall 3*b* and right and left side walls 3*c* and 3*d*, as shown in FIGS. 3A to 3C, and the mounting portion 9 for the cleaning cloth 4 protruding downward is formed in an inner side of the upper wall 3*a* of the cap main body 3.

On the contrary, a locking projection 9*a* is provided in an opposing and protruding manner at a predetermined space in a front side of the mounting portion 9 in the cleaning cloth 4.

Further, as shown in FIGS. 7A to 7C, and FIGS. 8A to 8C, an axial hole 8 fitting the spindle 7 in the right and left side surfaces 2*b* and 2*c* of the plug retainer 2 is formed in the right and left side walls 3*c* and 3*d* of the cap main body 3, the cap main body 3 is rotatable upward via the spindle 7 and the axial hole 8, and the mounting portion 9 for the cleaning cloth 4 is rotated sideways from the downward within the space portion W of the plug retainer 2 until the leading end of the locking projection 9*a* is locked to a back surface of the through port 6.

The front wall 3*b* of the cap main body 3 is protruded like a circular arc shape, a knurl 10 for slip resistance is formed in an outer surface in a lower end thereof, and an arrow mark 3*e* for rotating the cap main body 3 upward is formed in the right and left side walls 3*c* and 3*d* of the cap main body 3.

Figure 2G:
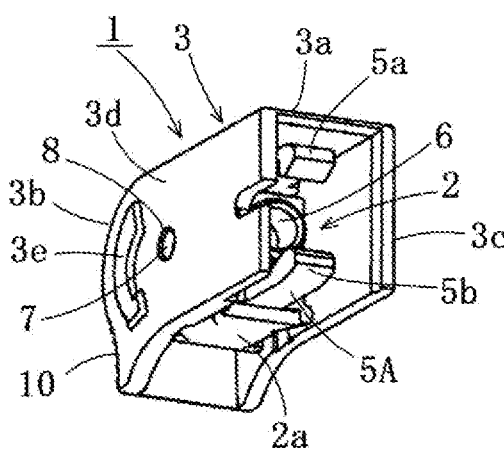
Figure 2H:
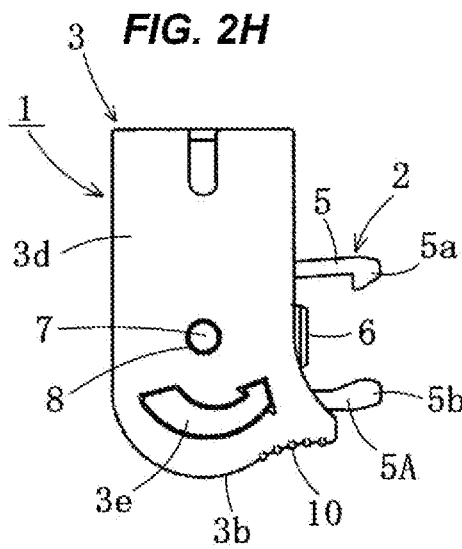
Figure 2I:
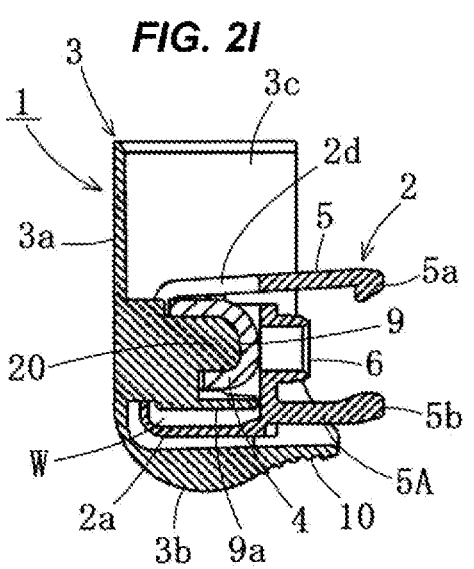

As shown in FIGS. 2, 3 and 9, the mounting portion 9 of the cleaning cloth 4 has an approximately quadrangular block 20 in a lower surface of the upper wall 3*a* of the cap main body 3, is formed into a round shape in a leading end of the block 20 in such a manner that the cleaning cloth 4 is curved like a circular arc shape and wound to the leading end, and is adjacently arranged in the space portion W in the front end side of the through port 6 of the plug retainer 2.

Further, the cleaning cloth 4 is mounted to the round portion in the leading end of the approximately quadrangular block 20 of the cap main body 3 and is curved and formed into the circular arc shape, comes into contact with a front end surface of the ferrule F protruding forward from the through port 6, and thereafter brings the leading end surface of the ferrule F into sliding contact on the basis of the upward rotation of the cap main body 3.

At the same time, as shown in FIGS. 3A and 3B, FIGS. 8A to 8C, FIG. 7D and FIGS. 9B and 9C, the ferrule F of the SC type optical connector plug P1 can be removed by lifting up the stop portion 5*a* side of the locking device 5 by means of a pair of projections 3*f* provided in a protruding manner at the symmetrical positions on the inner surface of the right and left side walls 3*c* and 3*d* and releasing the lock from the locking concave portion Q1.

Next, a description will be given of an example of using the embodiments constructed as mentioned above.

In the SC type optical connector plug P1 inserted into the plug retainer 2 of the ferrule cleaner cap 1, the locking device 5 of the plug retainer 2 is locked to the locking concave portion Q1 of the knob R1, and the leading end surface of the ferrule F comes into contact with the cleaning cloth 4 of the cap main body 3 via the through port 6. Further, when the cap main body 3 is rotated above the plug retainer 2 via the spindle 7 and the axial hole 8, the cleaning cloth 4 wound to the mounting portion 9 formed in the leading end of the approximately quadrangular block 20 disposed in the lower surface of the upper wall 3*a* of the cap main body 3 is rotated sideways from a downward direction, so that the cleaning cloth 4 wipes away the refuse and the other contaminated objects attached to the leading end surface of the ferrule F. At the same time, the ferrule F of the SC type optical connector plug P1 is taken out by slightly lifting up the stop portion 5*a* side of the locking device 5 by means of the projections 3*f* in the right and left side walls 3*c* and 3*d* of the cap main body 3 and releasing the lock of the stop portion 5*a* of the locking device 5 from the locking concave portion Q1.

On the contrary, the leading end of the arm 5A arranged in an opposing manner below the locking device 5 is formed into the circular arc shape 5*b*, and accordingly slides without engaging with the portion Q1 of the other knob R1, thereby not obstructing disconnection of the optical plug P1. Therefore, it is possible to smoothly take out the SC type optical connector plug R1 from the plug retainer 2.

Second Embodiment

Figure 6A:
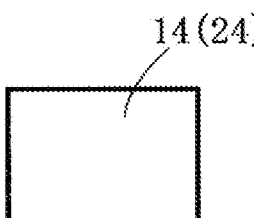
Figure 6B:
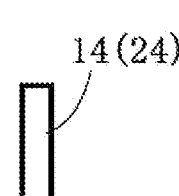
Figure 6C:
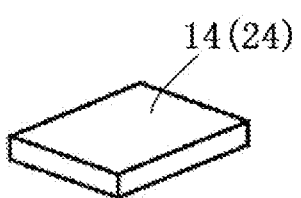
Figures 7A, 7B, 7C, 7D:
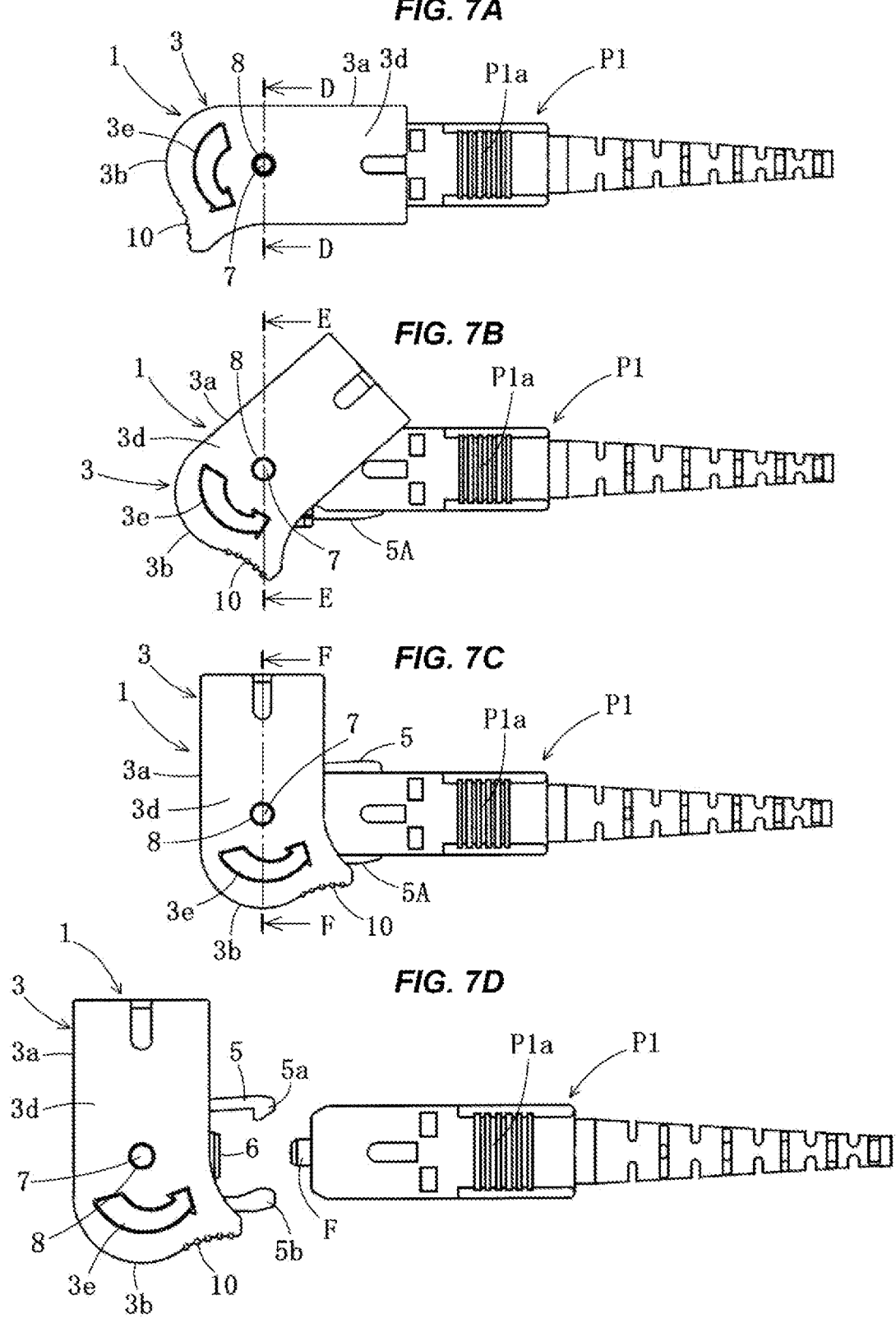
Figure 8A:
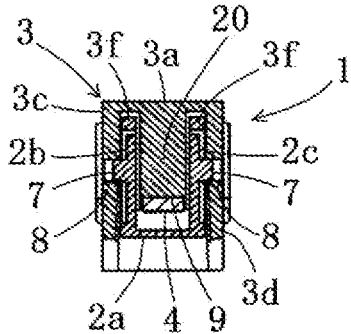
Figure 8B:
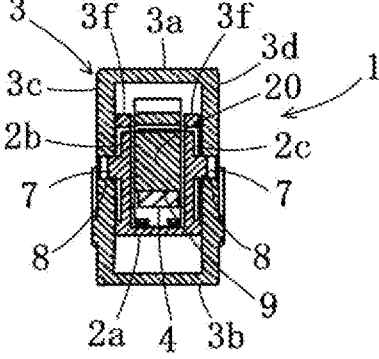
Figure 8C:
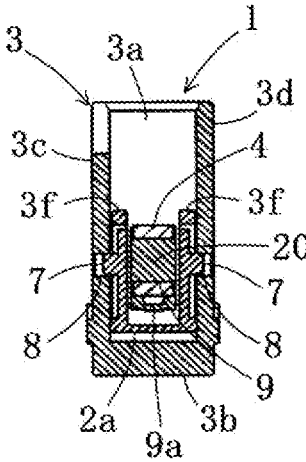
Figure 10A:
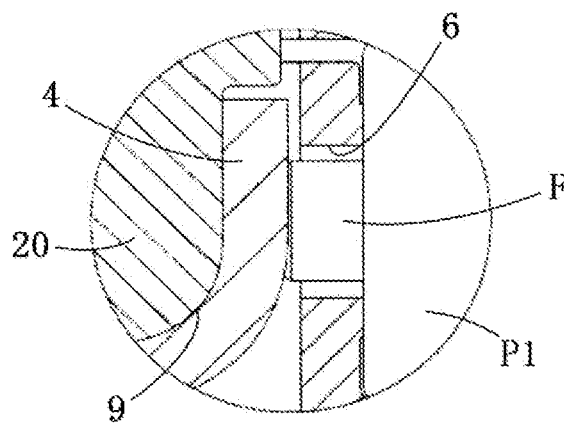
Figure 10B:
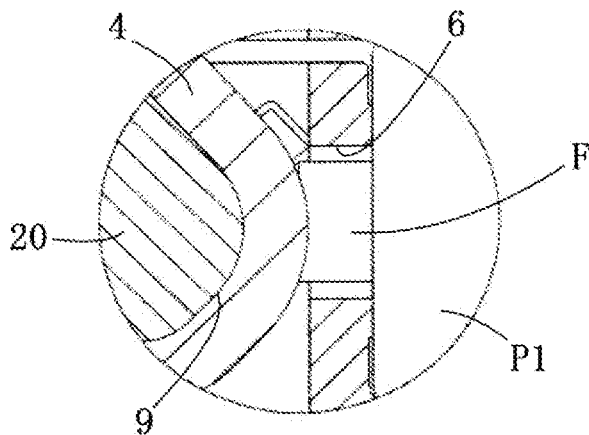
Figure 10C:
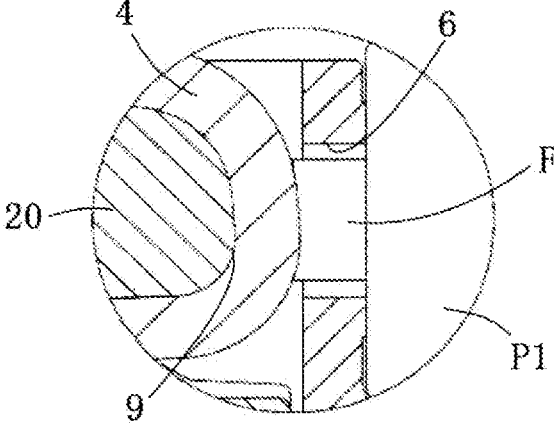
Figure 11A:
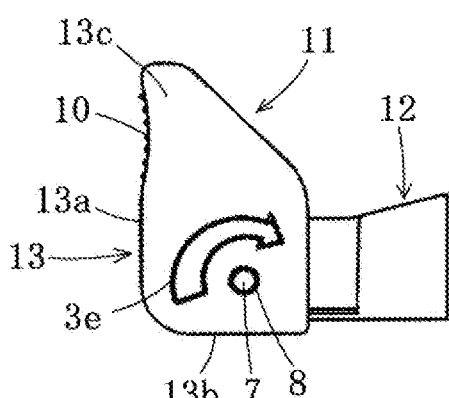
Figure 11B:
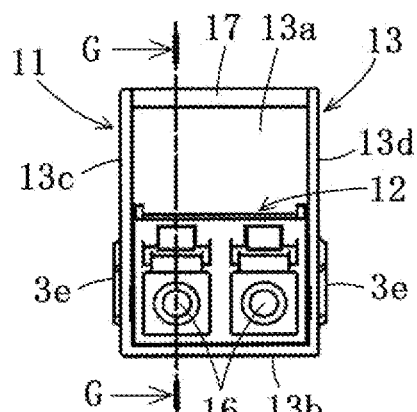
Figure 11C:
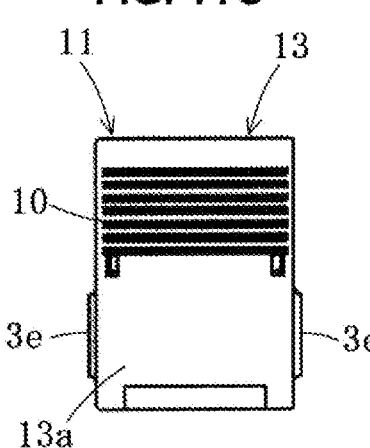
Figure 11D:
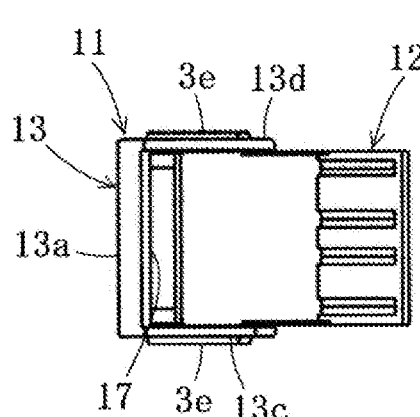
Figure 11E:
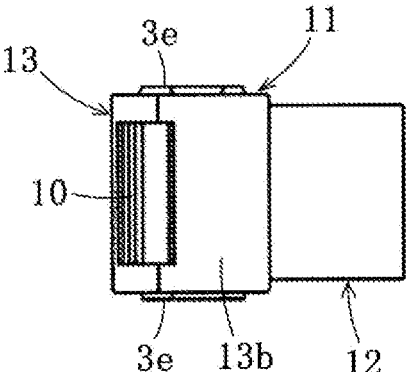
Figure 12F:
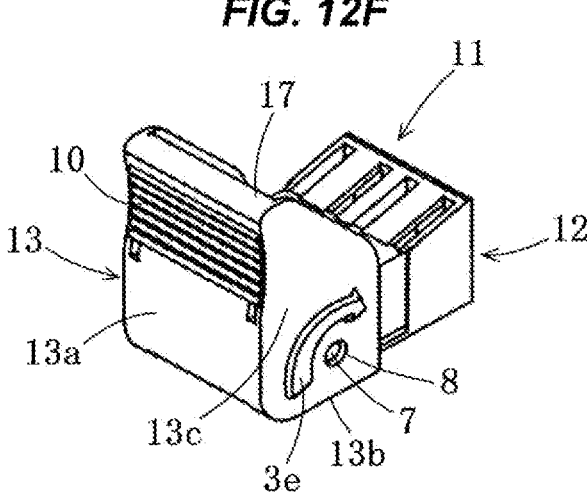
Figure 12G:
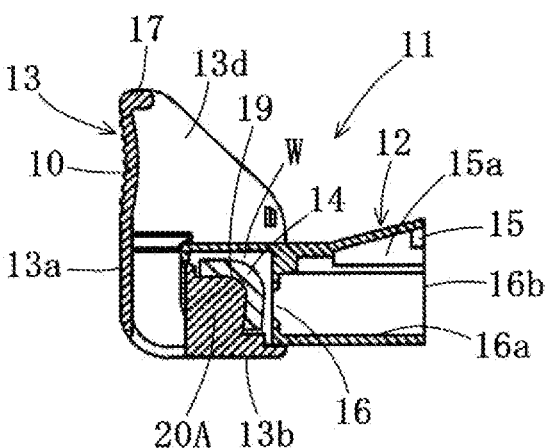

Next, a description will be given in detail of a second embodiment according to the present invention with reference to FIGS. 11 to 19. In the present embodiment, as shown in FIGS. 11A to 11E and FIGS. 12F and 12G, a ferrule cleaner cap 11 corresponding to a dual LC type optical connector plug P2 is formed with a rectangular box-shaped plug retainer 12 for two adjacently arranged LC type optical connector plugs P2, a vertically long cap main body 13 which is rotatable with respect to two plug retainers 12, and a wide cleaning cloth 14 shown in FIG. 6 is mounted to the cap main body 13 and has a flexibility.

Figure 16A:
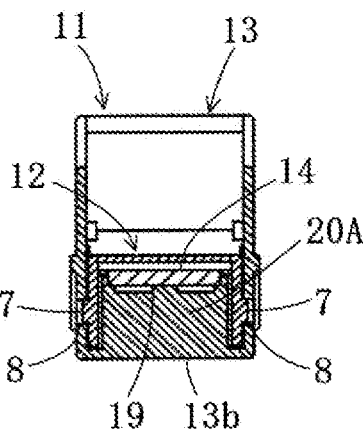
Figure 16B:
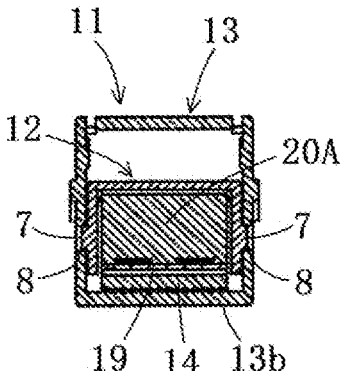
Figure 16C:
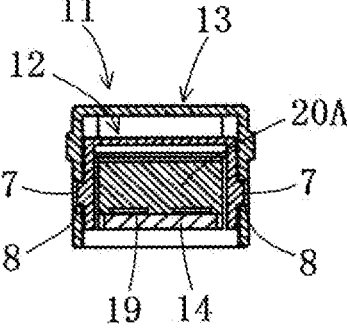

As shown in FIG. 16, the LC type optical connector plug P2 is disposed so as to be inclined toward a rear side of an upper portion of the coupling sleeve R2, is provided with a release lever T2 which has an engagement projection S2 in both side surfaces, and a latch lever V2 which is disposed so as to be inclined toward a front side of an upper portion of the main body frame U2, and is structured such that both the levers T2 and V2 come into contact with each other so that respective leading ends are mutually approachable and separable each other.

The plug retainer 12 is provided in a rear end with a plug housing portion 16*a* having an opening 16*b* which inserts and removes the LC type optical connector plug P2, and is also provided above the plug housing portion 16*a* with a lever housing portion 15*a* for pressing and press releasing the release lever T2 with a locked portion 15 in both right and left sides, the locked portion 15 locking the engagement projection S2 in a freely engaging and disengaging manner, the engagement projection S2 being provided in a protruding manner in both right and left sides of the release lever T2.

Figure 18A:
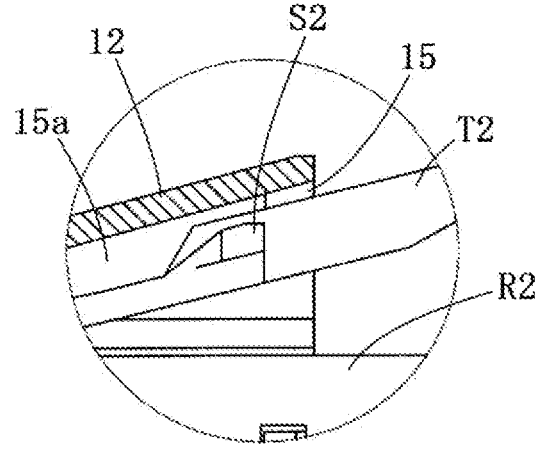
Figure 18B:
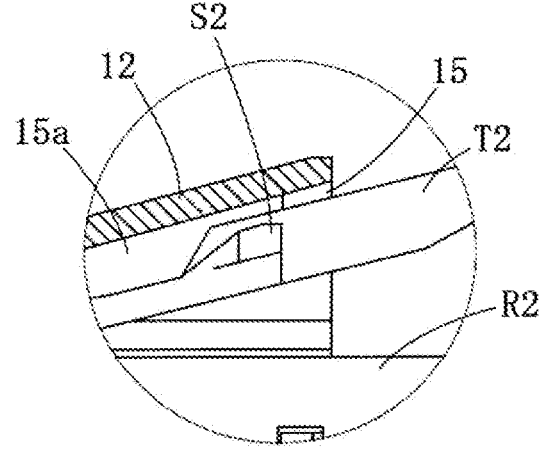
Figure 18C:
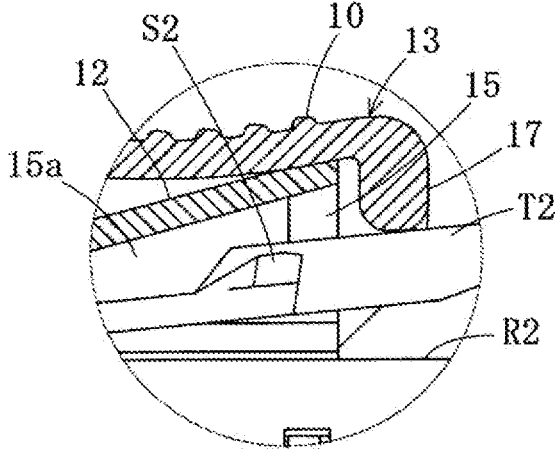

Further, a through port 16 for fitting the ferrule F of the LC type optical connector plug P2 is provided at the center of a front section wall of the plug housing portion 16*a*, and a space portion W housing a mounting portion 19 for the cleaning cloth 14 of the cap main body 13 is adjacently arranged in a front side in an opposite side of the through port 16 to the plug housing portion 16*a* (refer to FIGS. 15 and 18).

Figure 13A:
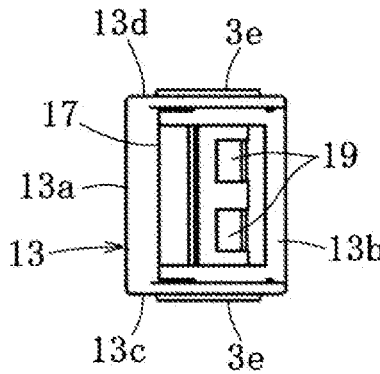
Figure 13B:
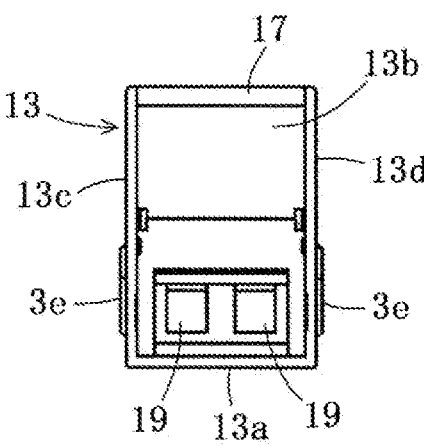
Figure 13C:
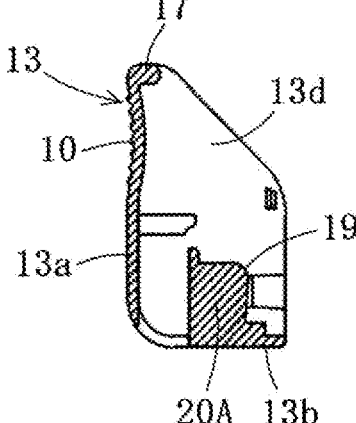
Figure 14A:
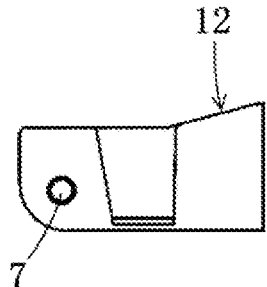
Figure 14B:
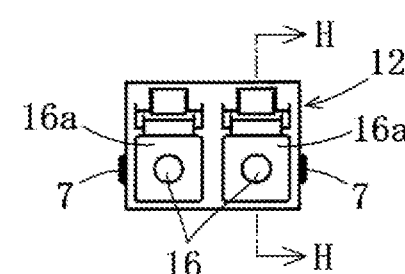
Figure 14C:
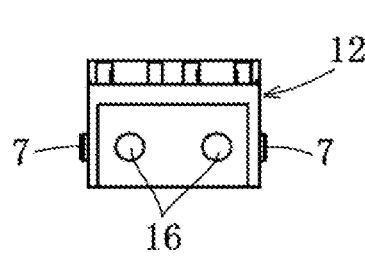
Figure 14D:
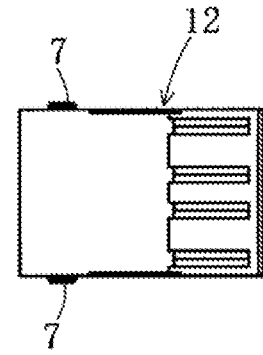
Figure 14E:
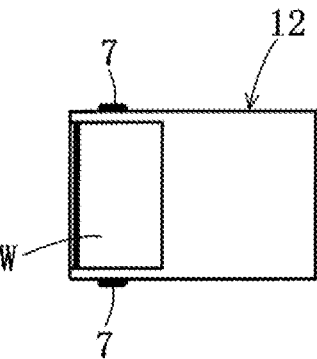
Figure 14F:
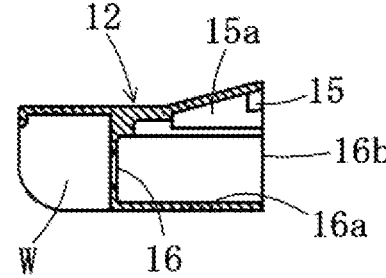
Figure 15A:
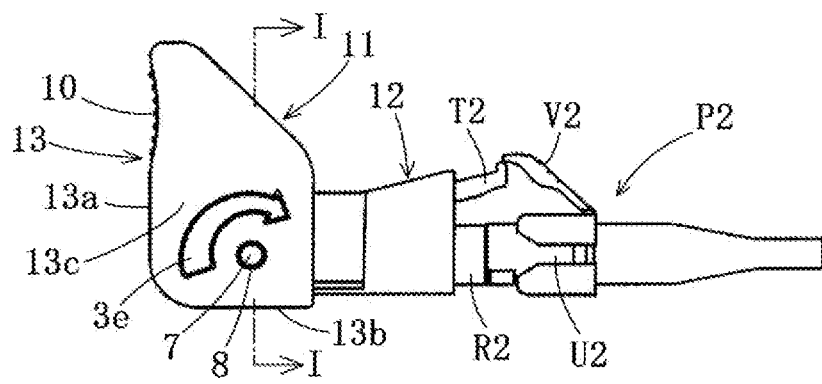
Figure 15B:
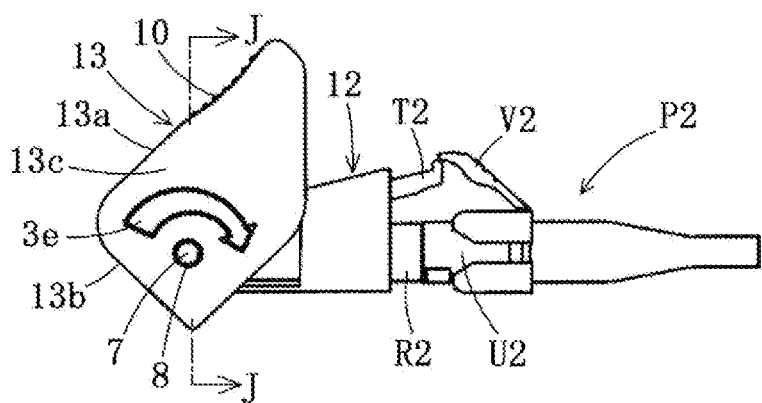
Figure 15C:
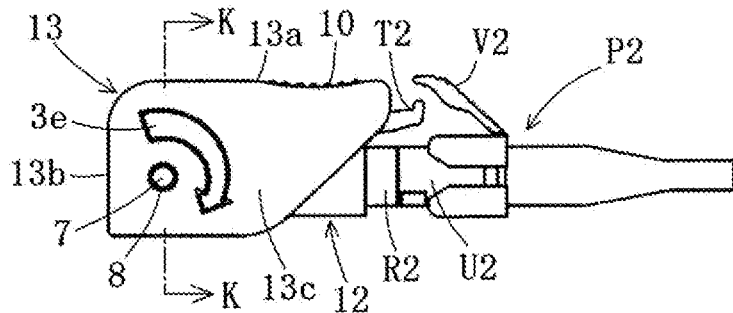
Figure 15D:
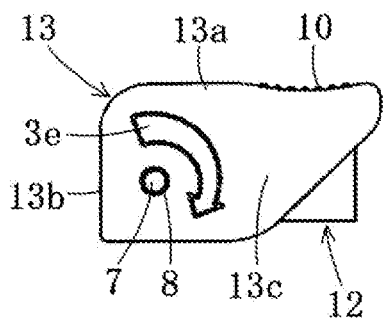
Figure 15D:
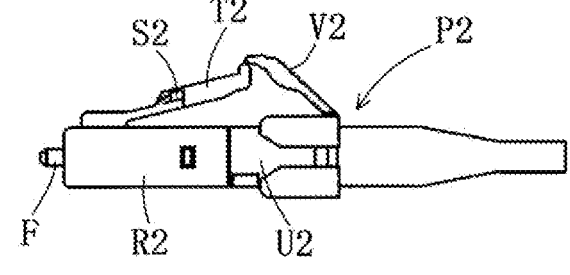

As shown in FIGS. 13A to 13C, the cap main body 13 has a front wall 13*a*, a lower wall 13*b*, and right and left side walls 13*c* and 13*d*, is open in a rear side and an upper side thereof, and is formed to be rotatable downward or upward via the spindle 7 and the axial hole 8 with respect to the plug retainer 12, and the mounting portion 19 for the cleaning cloth 14 protruding toward the above of an inner surface of the lower wall 13*b* is formed therein.

The mounting portion 19 disposed on the lower wall 13*b* of the plug main body 1 has an approximately quadrangular block 20A as shown in FIGS. 17 and 19, is formed into a round shape in a corner portion of the block 20A in such a manner that the cleaning cloth 14 is curved into a circular arc shape and wound to the corner portion, and is adjacently arranged in the space portion W in the front end side of the through port 16 of the plug retainer 12. Further, the cleaning cloth 14 mounted to the round corner portion of the block 20A of the plug main body 13 comes into contact with a front end surface of the ferrule F protruding forward from the through port 16, and thereafter brings the leading end surface of the ferrule F into sliding contact on the basis of the downward rotation of the cap main body 13.

In the meantime, the projection 17 disposed in an upper end of the front wall 13*a* of the cap main body 13 falls down to the LC type optical connector plug P2 side, and releases the locking of the engagement projection S2 of the release lever T2 from the locked portion 15 disposed in both sides of the inner portion of the lever housing portion 15*a* so as to allow the ferrule F to be removed. In the second embodiment, in the same manner as the first embodiment, the front wall 13*a* of the cap main body 13 slightly has a circular arc depression, a knurl 10 for slip resistance is formed in an upper end of the front wall 13*a*, and an arrow mark 3*e* indicating a direction of rotation is formed below the cap main body 13 in the right and left side walls 13*c* and 13*d* of the cap main body 13.

Next, a description will be given of an example of using the embodiments constructed as mentioned above.

As shown in FIGS. 15, 16 and 17, the engagement projection S2 of the release lever T2 in the LC type optical connector plug P2 inserted into the plug retainer 12 is locked to the locked portion 15 of the plug retainer 12, and the leading end surface of the ferrule F comes into contact with the cleaning cloth 14 of the cap main body 13 via the through port 16.

Figure 19A:
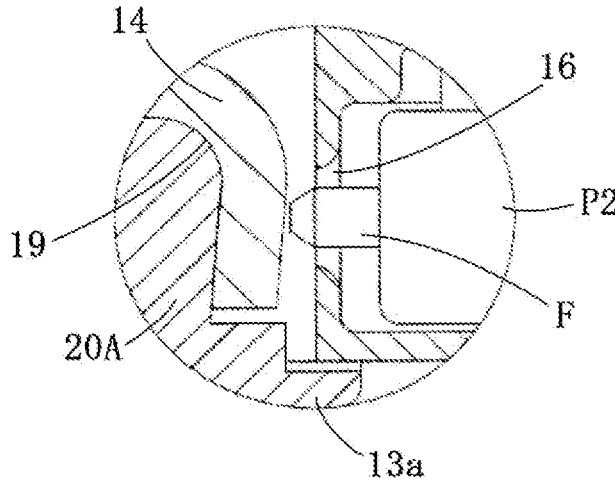
Figure 19B:
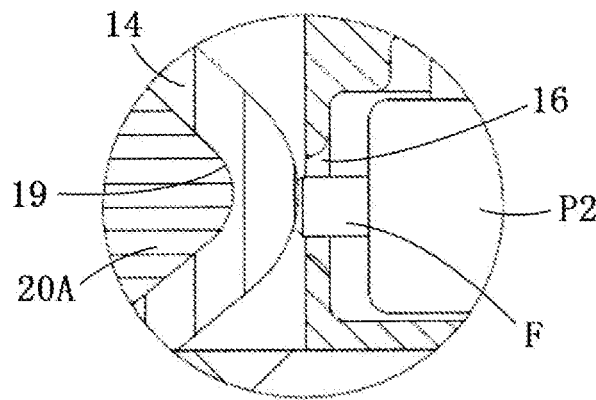
Figure 19C:
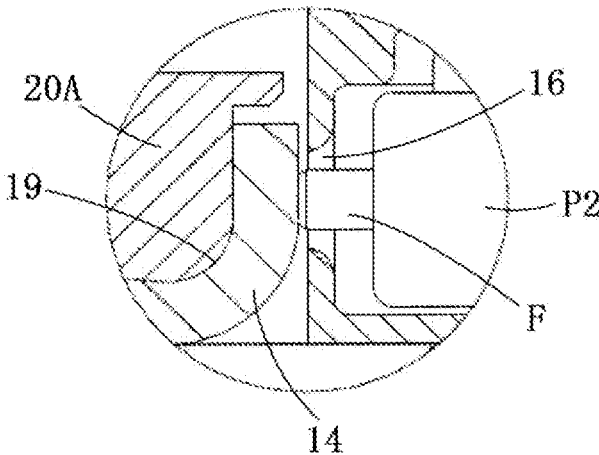
Figures 20A, 20B, 20C, 20D, 20E:
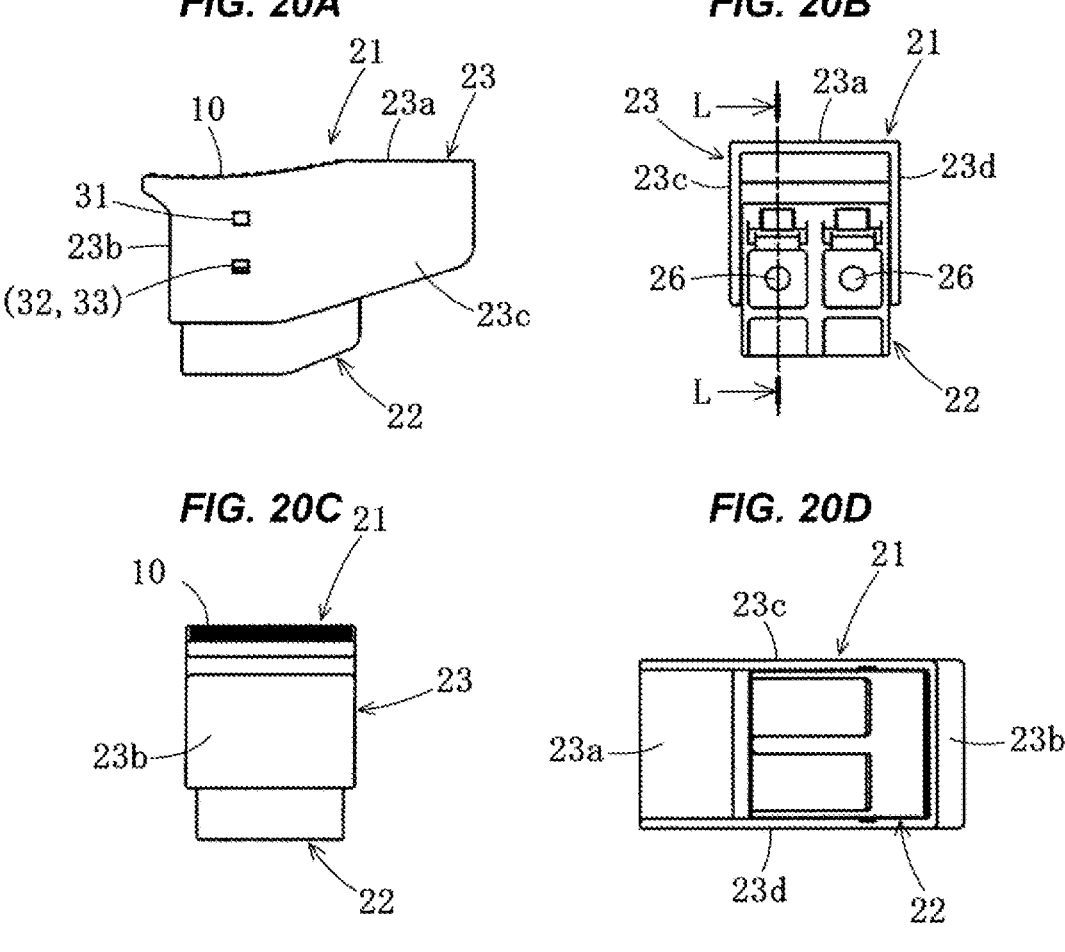
Figure 21F:
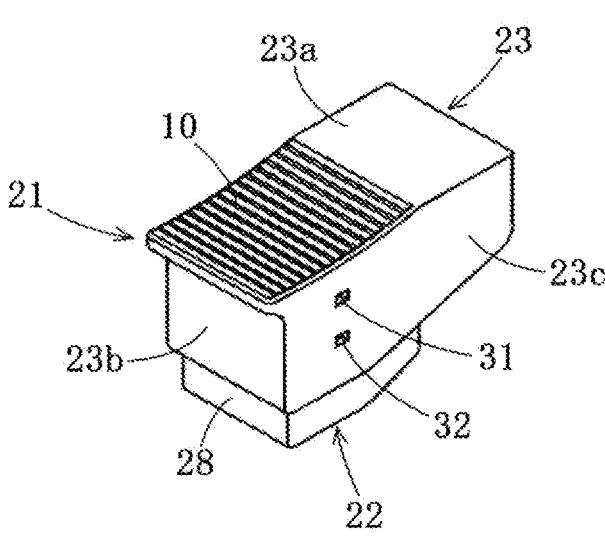
Figure 21G:
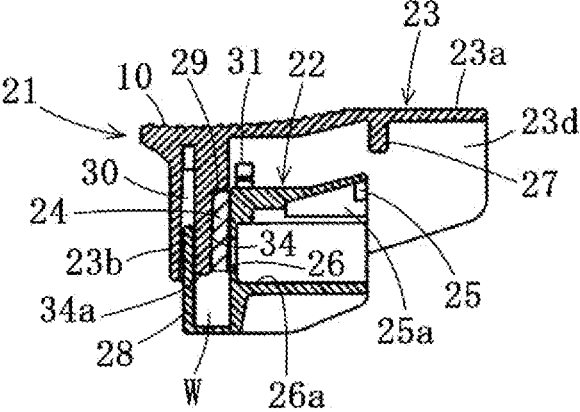
Figure 22A:
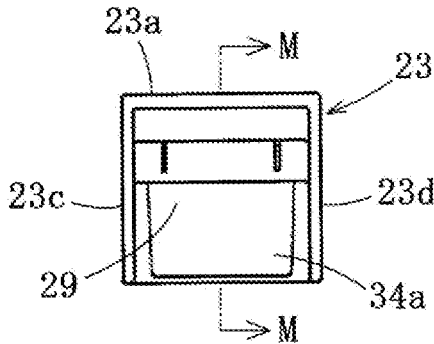
Figure 22B:
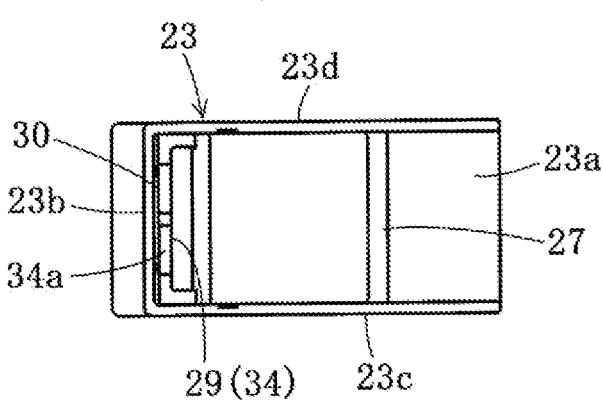
Figure 22C:
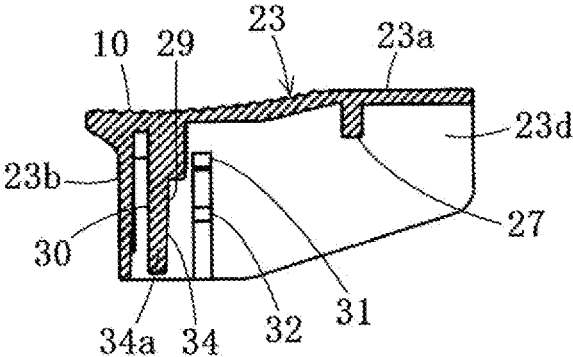
Figure 23A:
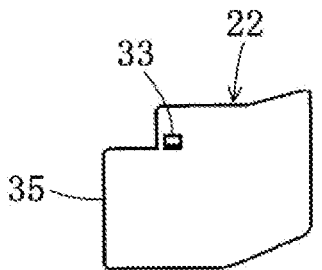
Figure 23B:
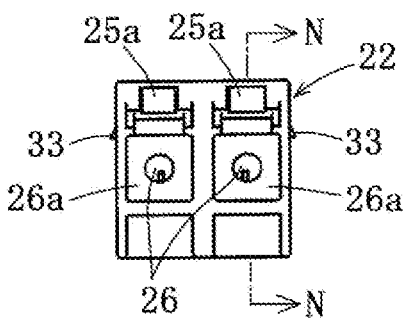
Figure 23C:
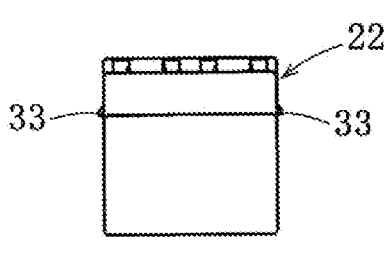
Figure 23D:
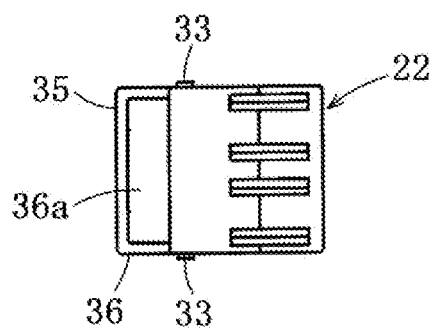
Figure 23E:
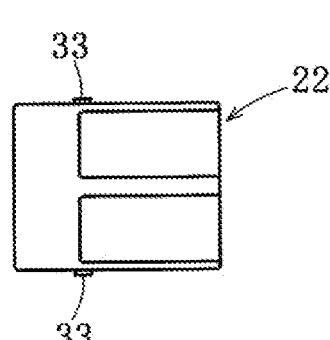
Figure 23F:
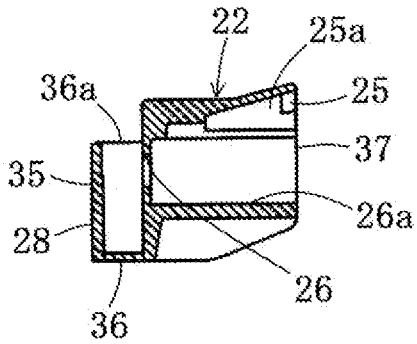

Thereafter, by rotating the cap main body 13 to a lower side of the plug retainer 12 via the spindle 7 and the axial hole 8, the cleaning cloth 14 wound to the arc-shaped corner portion of the block 20A constructing the mounting portion 19 moves downward from the upper side as shown in FIGS. 19A to 19C, thereby wiping away the refuse and the other contaminated objects attached to the leading end surface of the ferrule F. At the same time, the projection 17 of the front wall 13*a* of the cap main body 13 falls down to the LC type optical connector plug P2 side, and releases the locking of the engagement projection S2 from the locked portion 15 so as to take out the LC type optical connector plug P2.

Third Embodiment

Next, a description will be given in detail of a third embodiment according to the present invention with reference to FIGS. 20 to 26. In the present embodiment, as shown in FIGS. 20A to 20E, and FIGS. 21F and 21G, a push type ferrule cleaner cap 21 corresponding to an LC type optical connector plug P3 is formed with a plug retainer 22 which houses and retains the dual LC type optical connector plug P3, a cap main body 23 which has the plug retainer 22 built-in, is slidable up and down with respect to the plug retainer 22 and is formed into a wide rectangular shape, and a long cleaning cloth 24 which is mounted to the cap main body 23 and has a flexibility.

As shown in FIGS. 20A to 20E, FIGS. 21F and 21G, FIGS. 22A to 22C, FIG. 24, and FIGS. 25A to 25D, the LC type optical connector plug P3 is provided with a release lever T3 which is disposed to be inclined rearward in an upper portion of a coupling sleeve R3 and has engagement projections S3 on both side surfaces, and a latch lever V3 which is disposed to be inclined forward in an upper portion of a main body frame U3, in the same manner as the second embodiment, and both the levers T2 and V2 are structured such that their leading ends come into contact with each other in an approachable and separable manner.

A rear end of the plug retainer 22 mentioned above has a plug housing portion 26*a* having an opening 37 for inserting and removing the LC type optical connector plug P3, and a lever housing portion 25*a* for pressing the release lever T3 and releasing the pressing is provided above the plug housing portion 26*a*, the lever housing portion 25*a* having in both right and left sides locked portions 25 locking an engagement projection S3 in a freely engaging and disengaging manner, the engagement projection S3 being provided in a protruding manner in both right and left sides of the release lever T3. Further, a through port 26 for fitting the ferrule F of the LC type optical connector plug P3 is provided at the center of a front section wall of the plug housing portion 26*a*, and a cap holder 35 is adjacently arranged in a front side in an opposite side to the plug housing portion 26*a* in the through port 26. The cap main body 23 can be fitted upward or downward to the cap holder 35.

The cap holder 35 is formed by a fixing frame 36 having a rectangular shape in a plan view by fixing an open end side of an inverted-C shaped frame to a front end of the plug housing portion 26*a*, as shown in FIGS. 23 and 25. The fixing frame 36 is open in its upper end, and has a front face plate 28 in a front side of the front section wall of the plug housing portion 26*a* via a space fitting and fixing the cap main body 23.

The cap main body 23 is open in a rear side and a lower side thereof with an upper wall 23*a*, a front wall 23*b*, and right and left side walls 23*c* and 23*d*, as shown in FIG. 22, a rear plate 34*a* is arranged in an inner side of the front wall 23*b* at a predetermined space, and an insertion groove 30 is formed between the front wall 23*b* and the rear plate 34*a* for inserting the front face plate 28 of the plug retainer 22 from a lower end opening side and fixing and retaining the plug retainer 22 to the plug main body 23.

Figures 24A, 24B, 24C, 24D:
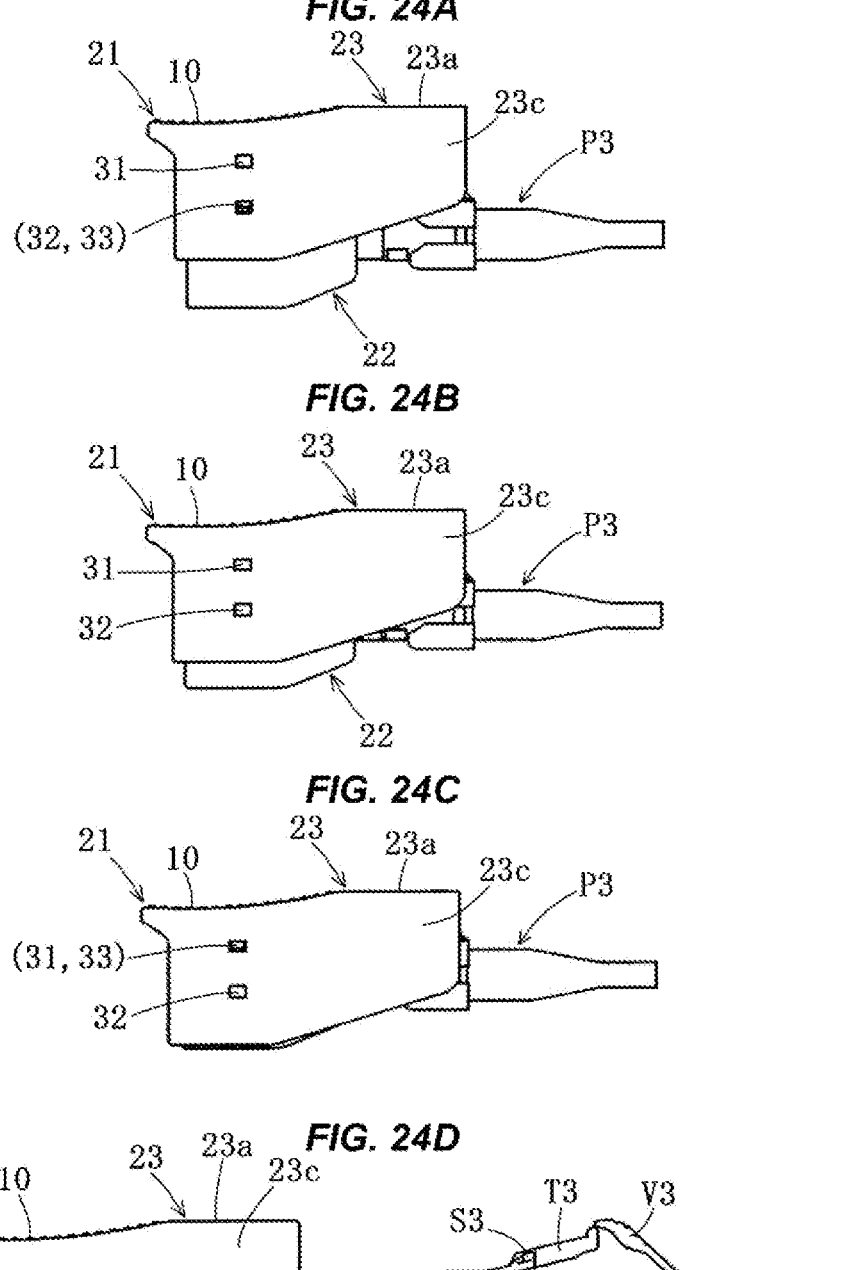
Figure 25A:
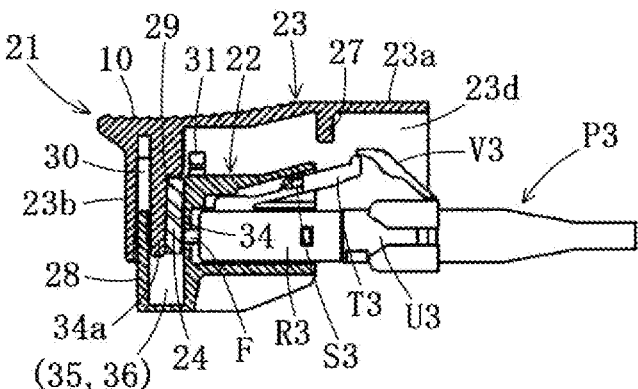
Figure 25B:
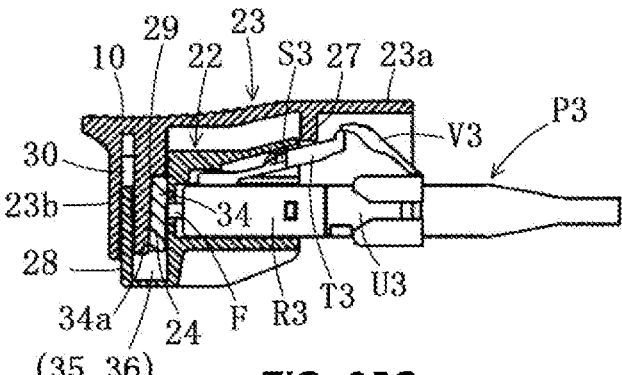
Figure 25C:
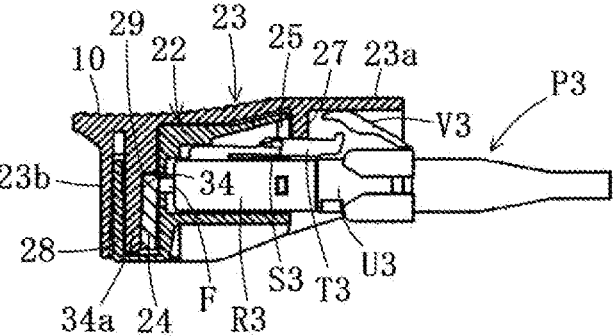
Figure 25D:
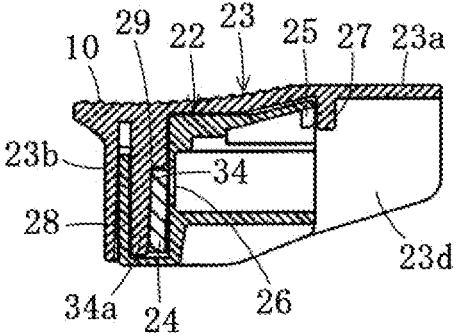
Figure 25D:
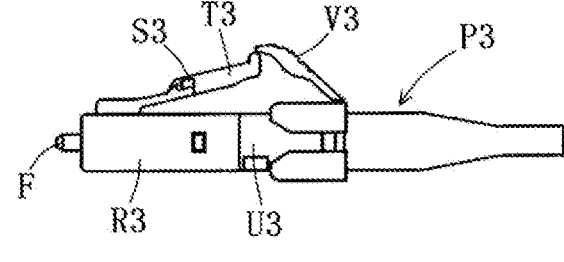
Figure 26A:
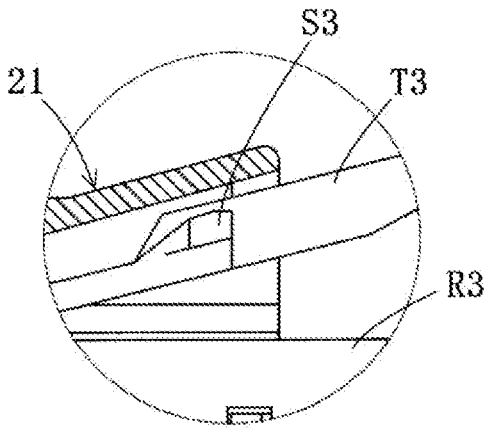
Figure 26B:
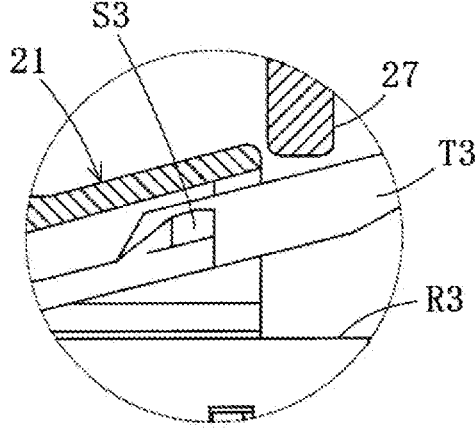
Figure 26C:
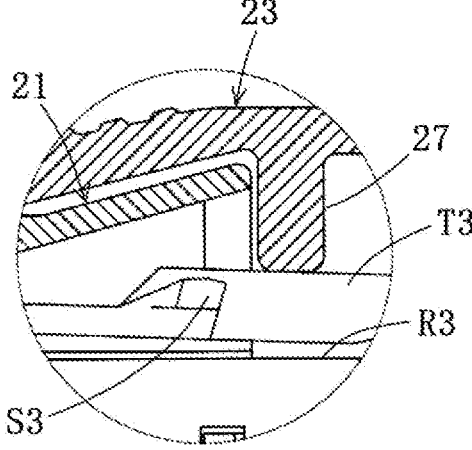

A rear lower side of the rear plate 34*a* of the cap main body 23 is notched, the notch portion 34 is formed as a mounting portion 29 to which the rectangular and flat plate shaped cleaning cloth 14 shown in FIG. 6 can be vertically mounted, and a projection 27 for pushing down the release lever T3 of the plug retainer 2 is perpendicularly provided in an inner rear side of an upper wall of the cap main body 23. Further, as shown in FIGS. 24, 25 and 26, the projection 27 of the cap main body 23 is positioned in a rear side of the plug retainer 22, and the LC type optical connector plug P3 can be drawn by pushing down the release lever T3 from the upper side by the projection 27 moving down in association with the downward sliding motion of the cap main body 23 when the LC type optical connector plug P3 is housed in the plug housing portion 26*a* of the plug retainer 22.

Further, stoppers 31, 32 and 33 for controlling a vertical sliding range of the cap main body 23 are disposed in upper and lower positions of the right and left side walls 23*c* and 23*d* of the cap main body 23, and right and left outer wall sides of the plug retainer 22. In this connection, as shown in FIGS. 21G, FIG. 20, FIG. 22C, FIG. 23 and FIG. 24, the stoppers 31 and 32 are positioned in the cap main body 23 side, and the stopper 33 is positioned in the plug retainer 22 side.

Next, a description will be given of an example of using the embodiments constructed as mentioned above.

As shown in FIGS. 25A to 25D, in the LC type optical connector plug P3 inserted into the plug housing portion 26*a* of the plug retainer 22, the engagement projection S3 of the release lever T3 arranged in the upper portion of the plug housing portion 26*b* is locked to the locked portion 25 of the plug retainer 22, and the leading end surface of the ferrule F simultaneously comes into contact with the cleaning cloth 14 of the cap main body 23 via the through port 26.

Figure 27A:
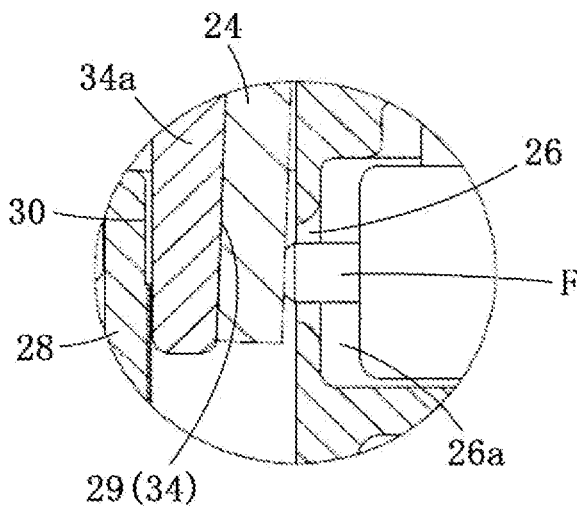
Figure 27B:
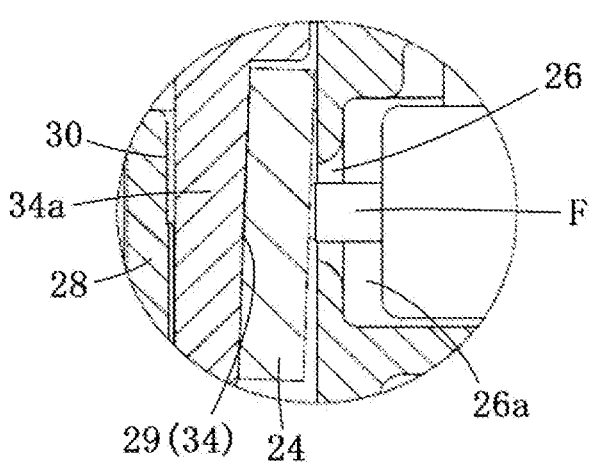
Figure 27C:
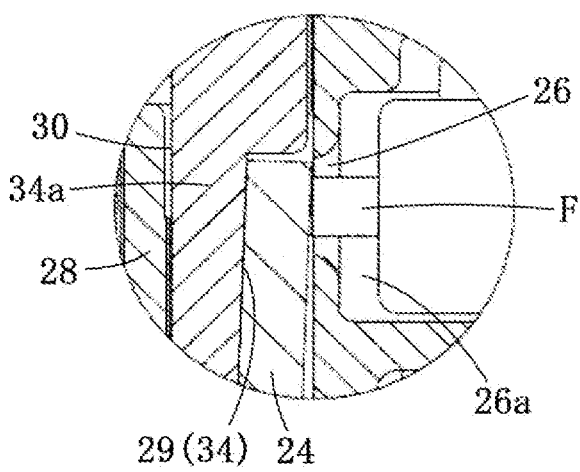

By downward sliding the cap main body 23 to the plug retainer 22 side, the cleaning cloth 14 vertically moves down from the above, the cleaning cloth 14 being mounted to the mounting portion 29 constructed by the notch portion 34 disposed in the rear lower side of the rear plate 34*a* of the cap main body 23 at a vertical position, as shown in FIGS. 27A to 27C. Thus, the cleaning cloth 14 wipes away the refuse and the other contaminated objects attached to the leading end surface of the ferrule F. At the same time, as shown in FIG. 25D, the projection 27 perpendicularly provided in the inner portion of the upper wall 23*a* of the cap main body 23 releases the locking of the engagement projection S3 of the release lever T3 from the locked portion 25 disposed in the plug retention portion 22 side, thereby taking out the LC type optical connector plug P3.

The optical connector plug used in the present invention is not limited to the SC type plug and the LC type plug mentioned above, but can use an MPO plug and the other optical connector plugs.

The invention claimed is:

1. A ferrule cleaner cap of an optical connector plug comprising:

a plug retainer having a through port for receiving a ferrule of the optical connector plug, the through port extending to a front end side of the plug retainer to enable a cleaning cloth to be brought into contact with a front face portion of the ferrule, and having an opening for inserting and removing the optical connector plug in a rear end side thereof; and a cap main body having the plug retainer built-in and forming in an inner side a cleaning cloth mounting portion configured to bring the cleaning cloth into contact with the front face portion of the ferrule when the ferrule front face portion is inserted into and retained in the through port such that the front face portion protrudes forwardly from the through port, wherein the cap main body is axially supported so as to be rotatable upward or downward with respect to the plug retainer, and the cleaning cloth is mounted to the mounting portion in an inner portion of the cap main body so as to bring the ferrule front face portion protruding forward from the through port of the plug retainer leading end into sliding contact upward or downward as the cap main body is rotated upward or downward with respect to the plug retainer, thereby cleaning the ferrule front face portion, and wherein the plug retainer includes a pair of retainers adapted to retain the optical connector plug, the pair of retainers including an upper retainer and a lower retainer which resiliently engage concave portions disposed in upper and lower portions of the optical connector plug to retain the optical connector plug in the plug retainer, wherein the through port for fitting the ferrule of the optical connector plug is provided between the upper and lower retainers at a center of a front section wall of a base portion of the cap main body, and wherein a space accommodating the cleaning cloth mounting portion in the inner portion of the cap main body is arranged at a front side of the plug retainer adjacent a front side of the through port from which the ferrule front face portion protrudes and is opposite the upper and lower retainers.

2. The ferrule cleaner cap of the optical connector plug according to claim 1, wherein the mounting portion of the cap main body is an approximately quadrangular block having a curved leading end to which the cleaning cloth is mounted, the cleaning cloth being made of a flexible material that enables the cleaning cloth to assume a circular arc shape when mounted on the approximately quadrangular block.

3. The ferrule cleaner cap of the optical connector plug according to claim 1, wherein the optical connector plug includes a release lever which extends diagonally rearward on an upper surface of an outer periphery of a coupling sleeve, and is provided with an engagement projection which protrudes from both right and left sides of the optical connector plug, and a latch lever which extends diagonally forward on an upper surface of an outer periphery of a main body frame of the optical connector plug and comes into contact with the protruding end of the release lever from above, and wherein the plug retainer is provided in a rear end with a plug housing portion having an opening for inserting and removing the optical connector plug, a lever housing portion provided above the plug housing portion for enabling pressing of the release lever is provided above the housing portion to release the optical connector, and wherein the release lever has on both right and left sides locked portions for locking and releasing the engagement projections protruding from both right and left sides of the release lever.

4. The ferrule cleaner cap of the optical connector plug according to claim 3, wherein the mounting portion of the cap main body is approximately quadrangular block having a curved leading end to which the cleaning cloth is mounted, the cleaning cloth being made of a flexible material that enables the cleaning cloth to assume a circular arc shape when mounted on the approximately quadrangular block.

5. The ferrule cleaner cap of the optical connector plug according to claim 1, wherein the cap main body has an upper wall, a front wall, and right and left side walls, and is open in a rear side and a lower side such that the mounting portion of the cleaning cloth is provided in a protruding manner in an inner side of the upper wall, and is formed so as to be rotatable upward and downward with respect to the plug retainer via a spindle which is provided in the right and left side walls.

* * * * *